US012015275B2

(12) United States Patent
Burra et al.

(10) Patent No.: US 12,015,275 B2
(45) Date of Patent: Jun. 18, 2024

(54) HYBRID POWER PLANT

(71) Applicant: General Electric Company, Schenectady, NY (US)

(72) Inventors: Rajni Burra, Scottsdale, AZ (US); Deepak Raj Sagi, Karnataka (IN); Arvind Kumar Tiwari, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 349 days.

(21) Appl. No.: 17/311,769

(22) PCT Filed: Dec. 12, 2019

(86) PCT No.: PCT/US2019/065970
§ 371 (c)(1),
(2) Date: Jun. 8, 2021

(87) PCT Pub. No.: WO2020/123799
PCT Pub. Date: Jun. 18, 2020

(65) Prior Publication Data
US 2022/0029424 A1    Jan. 27, 2022

(30) Foreign Application Priority Data
Dec. 12, 2018 (IN) .............................. 201841047089

(51) Int. Cl.
*H02J 3/38* (2006.01)
*G05B 19/042* (2006.01)
(Continued)

(52) U.S. Cl.
CPC ............ *H02J 3/381* (2013.01); *G05B 19/042* (2013.01); *H02J 3/004* (2020.01);
(Continued)

(58) Field of Classification Search
CPC ...... H02J 3/381; H02J 3/004; H02J 13/00001; H02J 2300/24; H02J 2300/28;
(Continued)

(56) References Cited

U.S. PATENT DOCUMENTS 7,930,070 B2    4/2011 Imes
8,099,198 B2    1/2012 Gurin
(Continued)

FOREIGN PATENT DOCUMENTS

CN    102882223 B    9/2016
EP    2080076 A2    7/2009
(Continued)

OTHER PUBLICATIONS

Yu et al., "Communication systems for grid integration of renewable energy resources", Journal of IEEE Xplore Digital Library, vol. 25. Issue 5, pp. 22-29, 2011.
(Continued)

*Primary Examiner* — Ramesh B Patel
(74) *Attorney, Agent, or Firm* — Armstrong Teasdale LLP

(57) ABSTRACT

A hybrid power plant including a plurality of power sources and controllers, a hybrid plant controller, and a computing system. The controllers operate the power sources according to operating set points. The hybrid plant controller transmits the operating set points to the controllers. The computing system is coupled to the hybrid plant controller and receives a first set of input parameters from a first subscriber, and carries out a first level of services to which the first subscriber subscribes to determine operating parameters for the first subscriber. The computing system receives a second set of input parameters from a second subscriber and carries out a second level of services to which the second subscriber subscribes to determine operating parameters for the second subscriber. The computing system then computes the oper-
(Continued)

ating set points based on aggregate operating parameters for the first and second subscribers.

20 Claims, 17 Drawing Sheets

(51) Int. Cl.
*H02J 3/00* (2006.01)
*H02J 13/00* (2006.01)
(52) U.S. Cl.
CPC .......... *H02J 13/00001* (2020.01); *G05B 2219/24215* (2013.01); *G05B 2219/2619* (2013.01); *H02J 2300/24* (2020.01); *H02J 2300/28* (2020.01)
(58) Field of Classification Search
CPC .......... H02J 2300/40; H02J 3/003; H02J 3/48; H02J 7/35; G05B 19/042; G05B 2219/24215; G05B 2219/2619; G06Q 30/06; G06Q 50/06; Y02E 10/56; Y04S 10/50; Y04S 50/10
See application file for complete search history.

(56) References Cited

U.S. PATENT DOCUMENTS

| | | | |
|---|---|---|---|
| 8,290,653 B2 | 10/2012 | Hofbauer | |
| 8,949,918 B2 * | 2/2015 | Totten | H04B 10/25751 725/111 |
| 9,287,710 B2 * | 3/2016 | Talkin | H02J 3/144 |
| 9,438,041 B2 | 9/2016 | Roy et al. | |
| 9,733,623 B2 | 8/2017 | Yang et al. | |
| 9,847,648 B2 * | 12/2017 | Shelton | H02J 3/381 |
| 9,960,637 B2 * | 5/2018 | Sanders | H02J 15/00 |
| 10,190,793 B2 * | 1/2019 | Drees | F24F 11/64 |
| 10,222,083 B2 * | 3/2019 | Drees | F24F 5/0035 |
| 11,159,022 B2 * | 10/2021 | Lee | G05B 13/048 |
| 11,163,271 B2 * | 11/2021 | Lee | G06Q 50/06 |
| 11,210,617 B2 * | 12/2021 | Drees | G06Q 10/06315 |
| 2012/0089523 A1 * | 4/2012 | Hurri | G06Q 30/016 702/62 |
| 2012/0323396 A1 | 12/2012 | Shelton et al. | |
| 2013/0013234 A1 * | 1/2013 | Ahmed | H02J 13/00001 702/62 |
| 2014/0297051 A1 | 10/2014 | Zhang et al. | |
| 2015/0094968 A1 * | 4/2015 | Jia | G05B 15/02 702/60 |
| 2016/0197519 A1 | 7/2016 | Carter et al. | |
| 2016/0218505 A1 * | 7/2016 | Krupadanam | H02J 3/06 |
| 2017/0017901 A1 * | 1/2017 | Firooz | G06N 20/00 |
| 2017/0061315 A1 * | 3/2017 | Leonard | G06F 16/2462 |
| 2017/0110882 A1 * | 4/2017 | Shelton | H02J 7/34 |
| 2023/0244197 A1 * | 8/2023 | Maruyama | G05B 23/024 700/295 |

FOREIGN PATENT DOCUMENTS

| | | | |
|---|---|---|---|
| EP | 3028358 B1 | 4/2017 | |
| WO | 2015031581 A1 | 3/2015 | |
| WO | WO-2015031581 A1 * | 3/2015 | .......... G05B 13/041 |

OTHER PUBLICATIONS

Tomislav et al., "Capacity Optimization of Renewable Energy Sources and Battery Storage in an Autonomous Telecommunication Facility", Journal of IEEE Xplore Digital Library, vol. 5. Issue 4, pp. 1367-1378, May 2014.
International Search Report and Written Opinion, dated Mar. 27, 2020, for PCT/US2019/065970.
Minciardi et al., "Optimal control in a cooperative network of smart power grids," IEEE Systems Journal 6, No. 1 (2011): 126-133.
Xu et al., "Adequacy and economy analysis of distribution systems integrated with electric energy storage and renewable energy resources," IEEE Transactions on power systems 27, No. 4 (2012): 2332-2341.

\* cited by examiner

HYBRID POWER PLANT

CROSS-REFERENCE TO RELATED APPLICATIONS

This application claims priority to Indian Provisional Application 201841047089 filed on Dec. 12, 2018 titled "Full Time Renewable Energy Based Power Plant," the entire contents of which are hereby incorporated herein by reference.

TECHNICAL FIELD

Embodiments of the present specification generally relate to a renewable energy based hybrid power plant and in particular, to a control system for the renewable energy based hybrid power plant.

BACKGROUND

Conventional power plants, such as fossil-fuel plants, generally rely on known energy production capacity and demand forecasts to control the plant's energy production, or that of multiple power plants. Renewable power plants, such as wind turbines or photovoltaic arrays, are generally more difficult to manage due to the inherent uncertainty in their energy source, e.g., wind and sunlight. When numerous power sources of various types are combined into a hybrid power plant that services a variety of consumers, or subscribers, with unique and ever-changing needs, managing power generation and storage within the hybrid power plant becomes more challenging.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

When describing elements of the various embodiments of the present specification, the articles "a", "an", and "the" are intended to mean that there are one or more of the elements. The terms "comprising", "including" and "having" are intended to be inclusive and mean that there may be additional elements other than the listed elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

Figure 1:
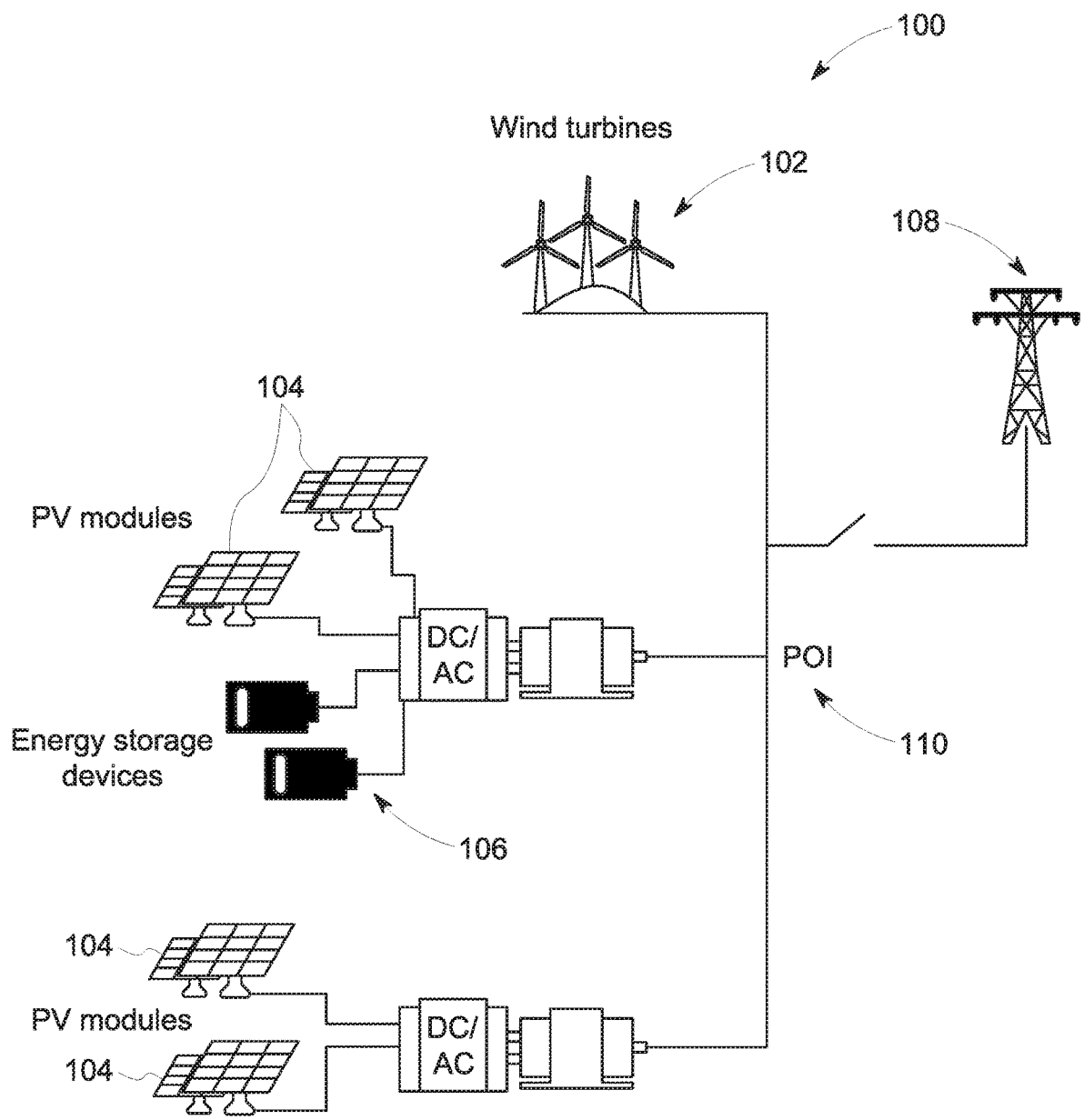
FIG. 1 is a block diagram representation of a renewable energy based hybrid power plant, in accordance with one embodiment of the present specification.

FIG. 1 is a block diagram representation of a renewable energy based hybrid power plant 100, in accordance with one embodiment of the present specification. In some embodiments, the renewable energy based hybrid power plant 100 may include one or more power sources. The power sources may include one or more wind turbines 102, one or more photovoltaic (PV) modules 104, a set of energy storage devices 106, and other type of power generation sources (e.g., hydro-turbines, coal based power plants, gas turbines, or combinations thereof—not shown).

In some embodiments, the wind turbines 102 may be installed in one or more clusters. Such clusters of the wind turbines 102 may individually or collectively be referred to as a wind farm. The wind turbines 102 are capable of generating electricity based on wind energy.

Further, in certain cases, multiple PV modules 104 may be arranged in a solar power park. The PV modules 104 are configured to generate electricity depending on a time of the day, solar insolation, weather conditions, and the like. The PV modules 104 may be arranged in a series combination, in a parallel combination, or in a series parallel combination in the solar power park. Each of the PV modules 104 may include one or more PV panels that are arranged in a series combination, in a parallel combination, or in a series parallel combination. Further, the set of energy storage devices 106 may include one more batteries, capacitors, flywheel based energy storage systems, pumped-hydro energy storage systems, or combinations thereof. In the description hereinafter, the terms "energy storage device" and "battery" are interchangeably used.

Moreover, the power sources of FIG. 1 may be interconnected in a variety of configurations, without limiting a scope of the present specification. Some such example configurations of the power sources of FIG. 1 are depicted in FIGS. 2A-2H. During operation of the hybrid power plant 100, the electrical power generated by one or more of these power sources may be supplied to a power grid 108 and/or one or more electrical loads via a point of interconnect (POI) 110. By way of example, the power grid 108 may be a utility power 100 grid or a micro-grid. The power sources may be connected to the power grid 108 or the electrical loads at the POI 110.

Figure 2A:
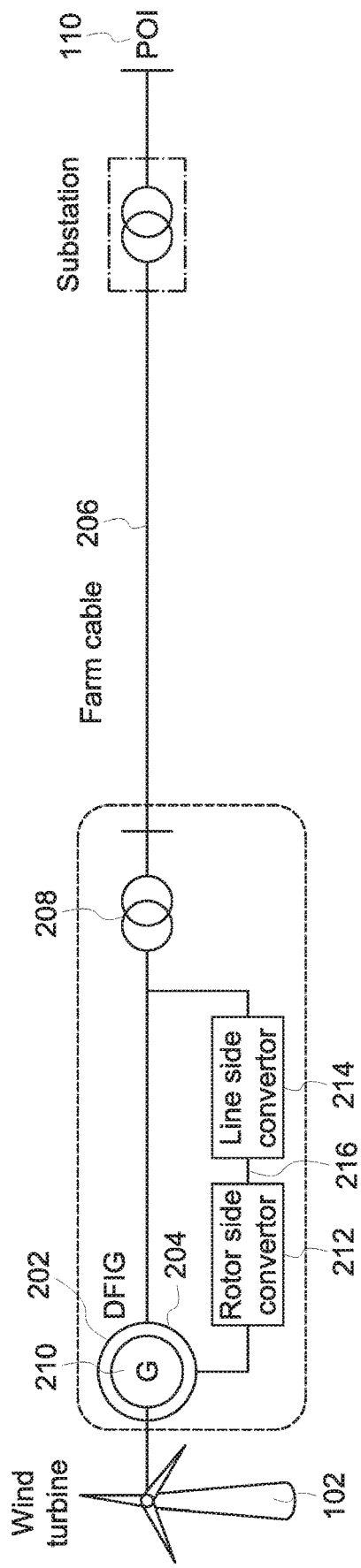
FIGS. 2A-2H show block diagram representations of example configurations of power sources in the hybrid power plant of FIG. 1, in accordance with one embodiment of the present specification.

FIGS. 2A-2H show block diagram representations of example configurations of power sources in the hybrid power plant 100 of FIG. 1, in accordance with one embodiment of the present specification. By way of example, FIG. 2A shows a block diagram representation of an example configuration depicting connection of one example wind turbine 102 in the hybrid power plant 100 of FIG. 1. As depicted in FIG. 2A, the wind turbine 102 may be connected to the POI 110 via a doubly-fed induction generator (DFIG) 202. In particular, a stator winding 204 of the DFIG 202 may be connected to a farm cable 206 via a transformer 208 and a rotor winding 210 of the DFIG 202 may be connected to the stator winding 204 via a rotor-side converter 212 and a line-side converter 214. The rotor-side converter 212 is coupled to the line-side converter 214 via a direct current (DC) link 216. By way of example, the rotor-side converter 212 and the line-side converters 214 may be bidirectional AC-DC converters.

Figure 2B:
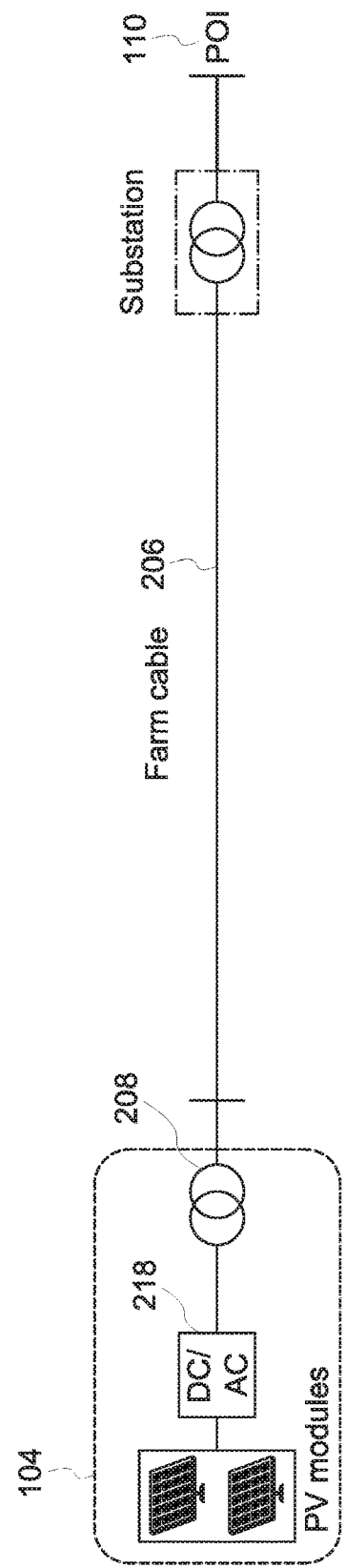

Further, FIG. 2B shows a block diagram representation of an example configuration depicting connection of a couple of example PV modules 104 in the hybrid power plant 100 of FIG. 1. As depicted in FIG. 2B, the PV modules 104 may be connected to the POI 110 via a DC-AC converter 218. The DC-AC converter 218 is configured to convert DC power generated by the PV modules 104 into an AC power suitable to be supplied to the POI 110.

Figure 2C:
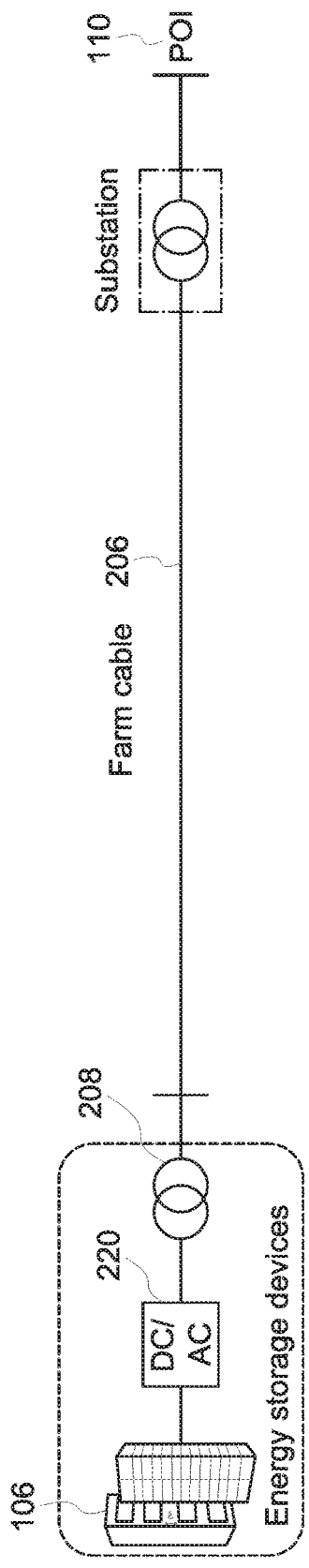

Furthermore, FIG. 2C shows a block diagram representation of an example configuration depicting connection of the set of energy storage devices 106 (e.g., batteries) in the hybrid power plant 100 of FIG. 1. As depicted in FIG. 2C, the energy storage devices 106 may be connected to the POI 110 via a bidirectional DC-AC converter 220. The bidirectional DC-AC converter 220 is configured to convert DC power received from the energy storage devices 106 into the AC power suitable to be supplied to the POI 110 whenever required. Also, in some embodiments, the energy storage devices 106 may be charged via the bidirectional DC-AC converter 220.

Figure 2D:
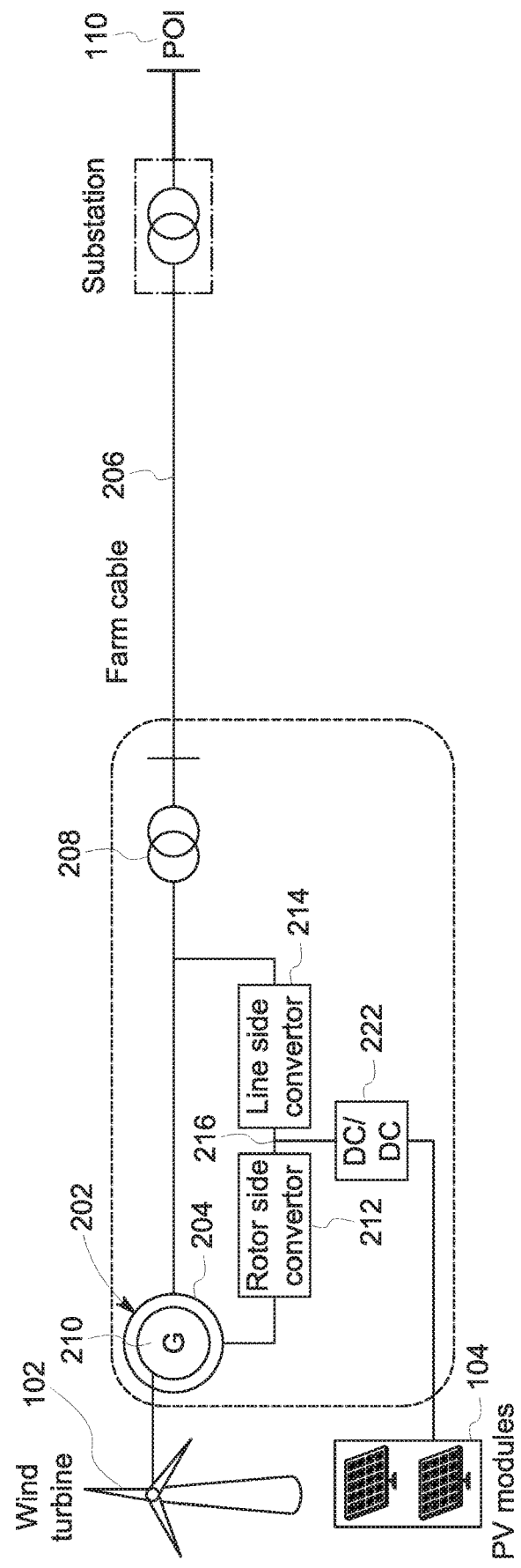
Figure 2E:
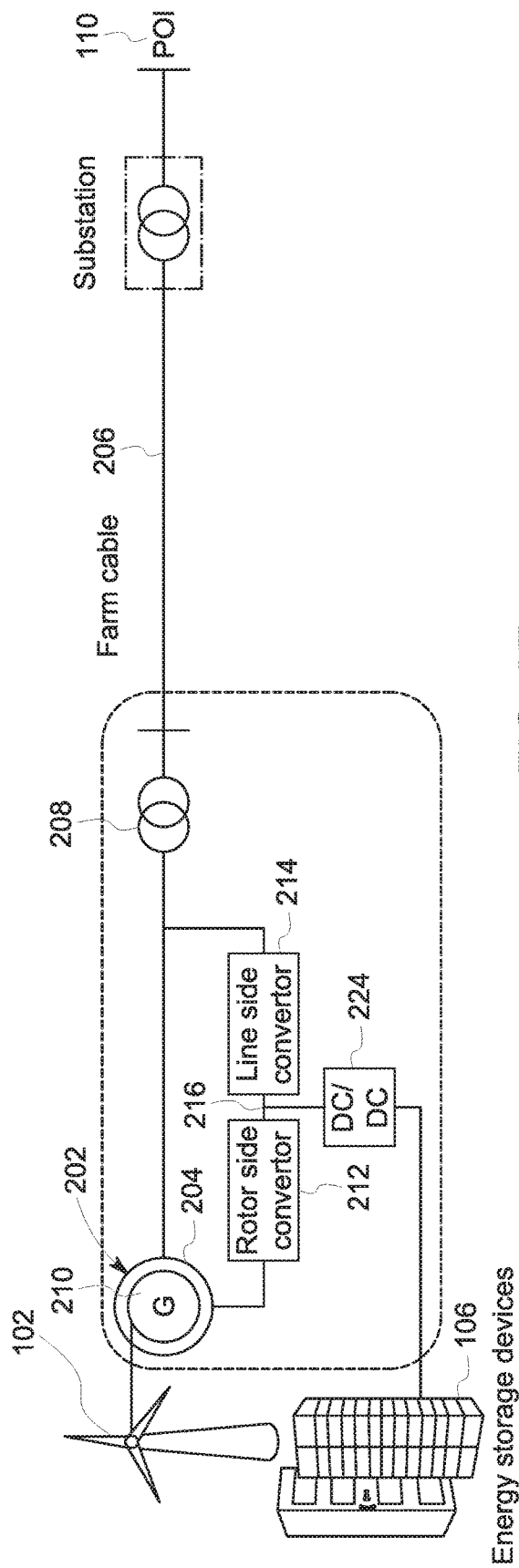

Moreover, FIG. 2D shows a block diagram representation of an example configuration depicting connection of the example wind turbine 102 and a couple of PV modules 104 in the hybrid power plant 100 of FIG. 1. For example, the wind turbine 102 may be connected to the POI 110 in a similar fashion as shown in FIG. 2A. Further, the PV modules 104 may be connected to the DC-link 216 between the rotor-side converter 212 and the line-side converter 214 via a DC-DC converter 222. Similarly, FIG. 2E shows a block diagram representation of an example configuration depicting connection of the example wind turbine 102 and the set of energy storage devices 106 in the hybrid power plant 100 of FIG. 1. For example, the wind turbine 102 may be connected to the POI 110 in a similar fashion as shown in FIG. 2A. Further, the energy storage devices 106 may be connected to the DC-link 216 between the rotor-side converter 212 and the line-side converter 214 directly or via a DC-DC converter 224.

Figure 2F:
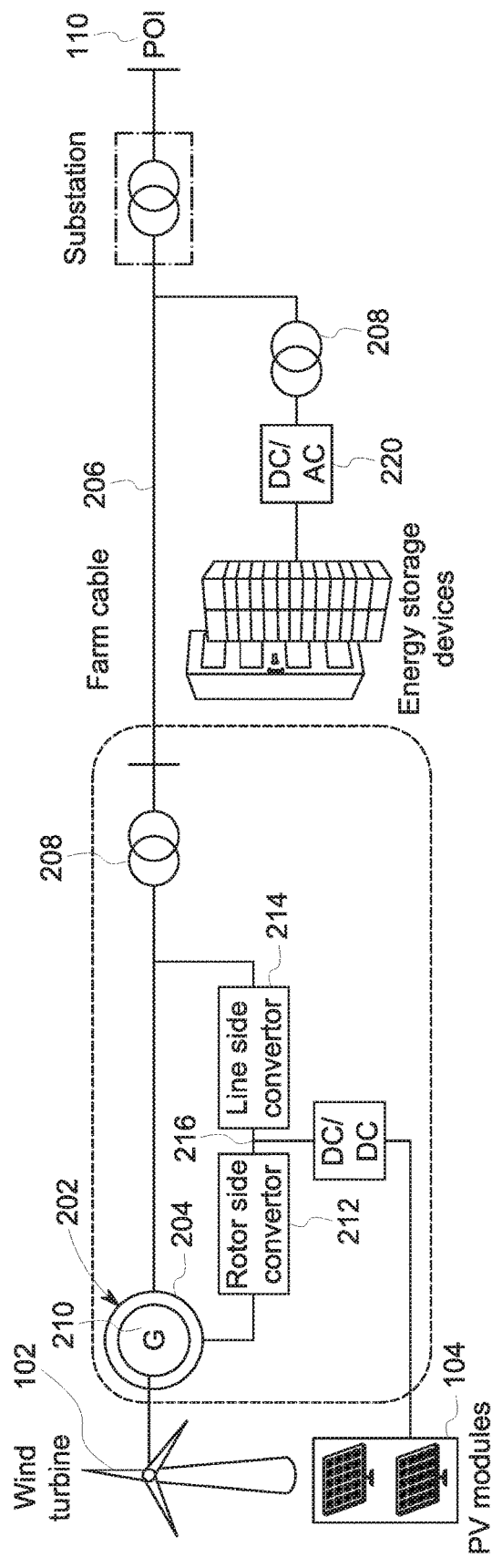

Further, FIG. 2F shows a block diagram representation of an example configuration depicting connection of the example wind turbine 102, the couple of PV modules 104, and the set of energy storage devices 106 in the hybrid power plant 100 of FIG. 1. For example, in the configuration of FIG. 2F, the wind turbine 102 and the PV modules 104 are connected to each other in a similar fashion as shown in FIG. 2D. Additionally, the energy storage devices 106 may be connected to the POI 110 in the similar fashion as shown in FIG. 2C.

Figure 2G:
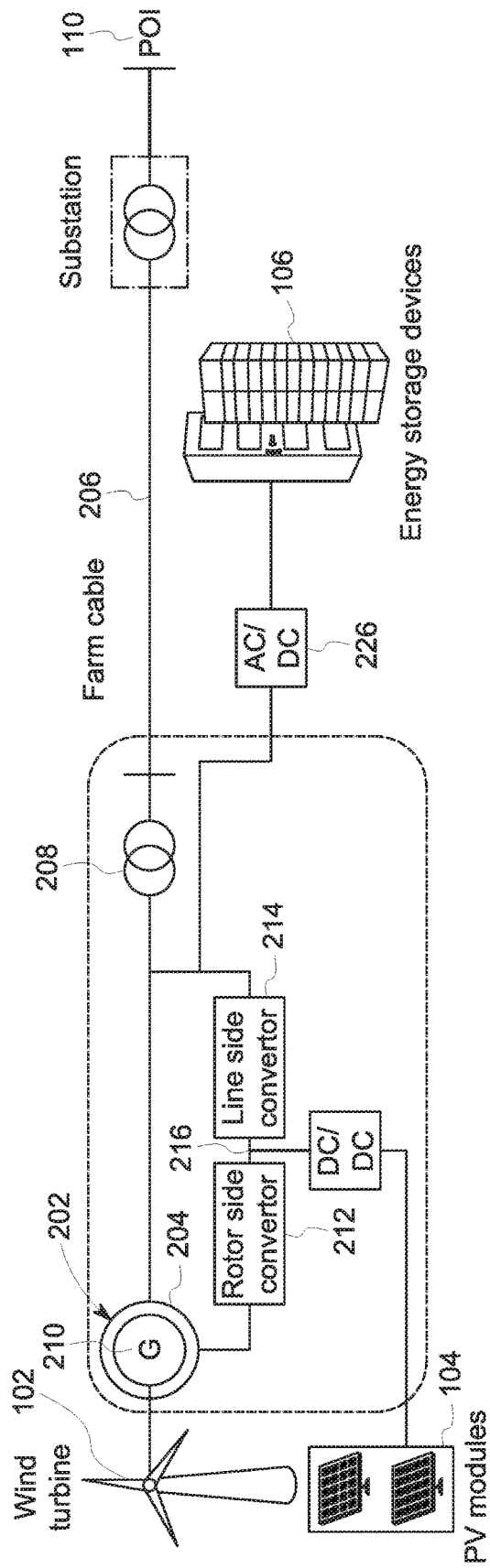

Furthermore, FIG. 2G shows a block diagram representation of another example configuration depicting connection of the example wind turbine 102, the couple of PV modules 104, and the set of energy storage devices 106 in the hybrid power plant 100 of FIG. 1. For example, in the configuration of FIG. 2G, the wind turbine 102 and the PV modules 104 are connected to each other in a similar fashion as shown in FIG. 2D. Additionally, the energy storage devices 106 may be connected to the line-side converter 214 (or the stator winding 204 of the DFIG 202) via a DC-DC converter 226 as shown in FIG. 2G.

Figure 2H:
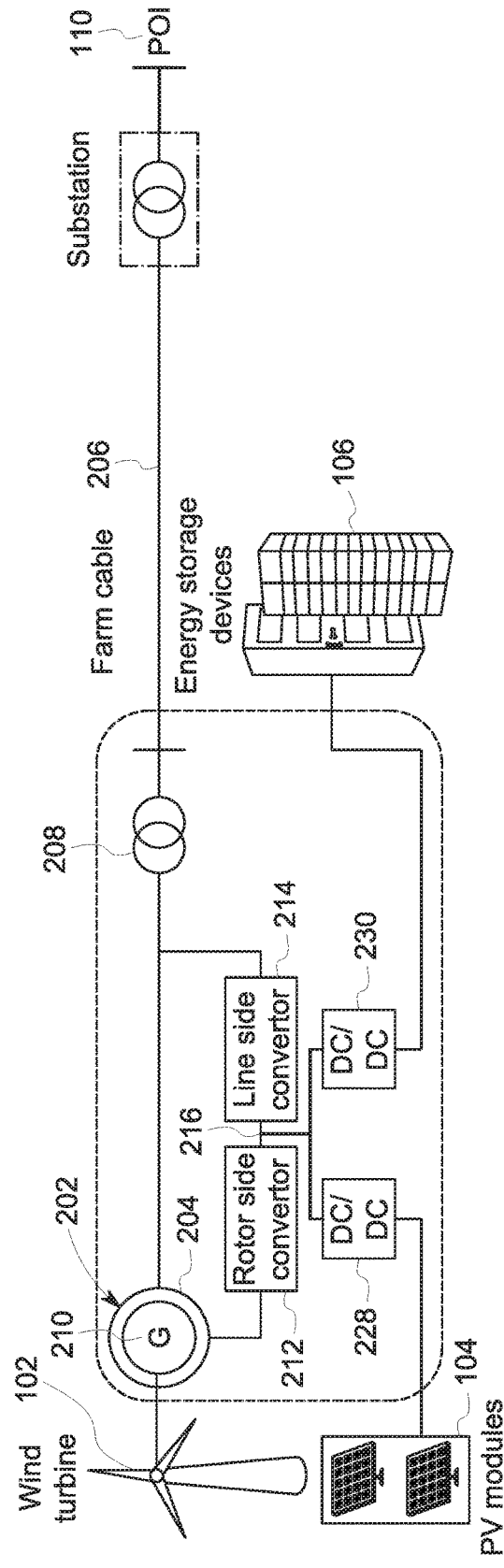

Moreover, FIG. 2H shows a block diagram representation of yet another example configuration depicting connection of the example wind turbine 102, the couple of PV modules 104, and the set of energy storage devices 106 in the hybrid power plant 100 of FIG. 1. For example, in the configuration of FIG. 2G, the wind turbine 102 may be connected to the POI 110 in a similar fashion as shown in FIG. 2A. Additionally, both the PV modules 104 and the energy storage devices 106 may be connected to the DC-link 216 between the line-side converter 214 and the rotor-side converter 212 via the respective DC-DC converters 228 and 230 as shown in FIG. 2H.

Further, in some embodiments, the integration of the power sources in these configurations depicted in FIGS. 1 and 2A-2H enhances control of power dispatch, a load following power generation, reduces wastage of power generation from the PV modules 104, and/or improves life time of the energy storage devices 106 in the hybrid power plant 100. Further, it is to be noted that, the configurations shown in FIGS. 1 and 2A-2H are non-limiting. The power sources may be connected in any suitable arrangement to achieve required power demand and other system requirements.

Figure 3:
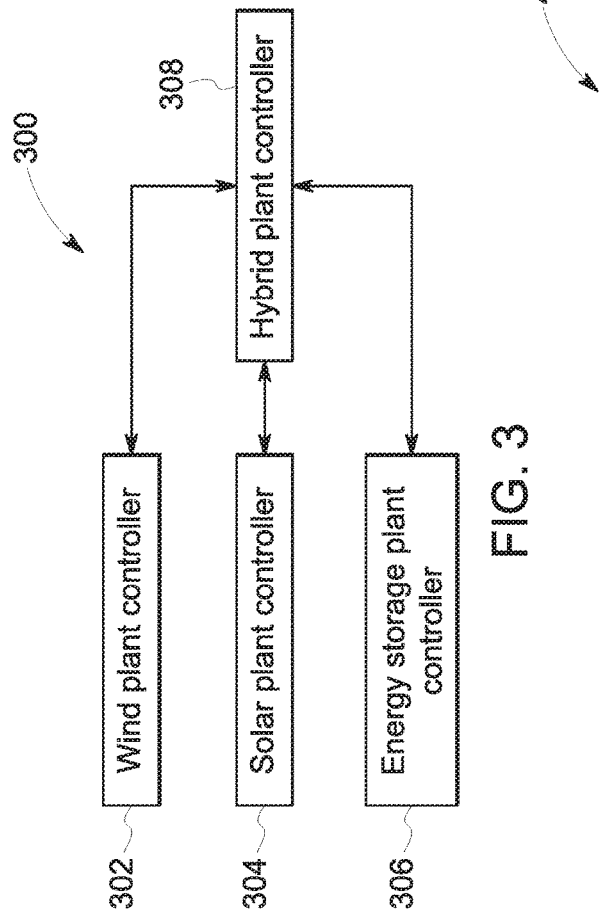
FIG. 3 is a block diagram representation of a control system for a hybrid power plant, in accordance with one embodiment of the present specification.

Moving now to FIG. 3, a block diagram representation of a control system 300 for the hybrid power plant 100 of FIG. 1 is presented, in accordance with one embodiment of the present specification. The control system 300 of FIG. 3 may be operatively coupled to the hybrid power plant, for example, the hybrid power plant 100 of FIG. 1. By way of a non-limiting example, the control system 300 of FIG. 3 includes one or more of a wind farm controller 302, a solar plant controller 304, an energy storage plant controller 306, or a hybrid plant controller 308.

In some embodiments, the wind farm controller 302 may be operatively coupled to one or more wind turbines 102 (shown in FIG. 1) and configured to control operations of the one or more wind turbines 102. Further, the solar plant controller 304 may be operatively coupled to one or more PV modules 104 (shown in FIG. 1), a string of PV modules 104, or combinations thereof disposed in the solar power park. The solar plant controller 304 may be configured to control operations of the PV modules 104, the string of PV modules 104, or combinations thereof. Moreover, the energy storage plant controller 306 may be operatively coupled to the set of energy storage devices 106 (e.g., batteries, shown in FIG. 1) configured to control charging and discharging of the set of energy storage devices 106.

Further, the hybrid plant controller 308 is operatively coupled to the wind farm controller 302, the solar plant controller 304, and the energy storage plant controller 306 and configured to control operations thereof. In particular, the hybrid plant controller 308 may be configured to distribute set-points to the wind farm controller 302, the solar plant controller 304, and the energy storage plant controller 306. In the embodiment of FIG. 3, the hybrid plant controller 308 is shown separately from the wind farm controller 302, the solar plant controller 304, and the energy storage plant controller 306. In some other embodiments, any of the wind farm controller 302, the solar plant controller 304, and the energy storage plant controller 306 may be configured to be operated as the hybrid plant controller 308.

In some embodiments, one or more of the wind farm controller 302, the solar plant controller 304, the energy storage plant controller 306, or the hybrid plant controller 308 may individually include a specially programmed general-purpose computer, an electronic processor such as a microprocessor, a digital signal processor, and/or a microcontroller. Further, the wind farm controller 302, the solar plant controller 304, the energy storage plant controller 306, or the hybrid plant controller 308 may include input/output ports, and a 200 storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, one or more of the wind farm controller 302, the solar plant controller 304, the energy storage plant controller 306, or the hybrid plant controller 308 may be implemented as hardware elements such as circuit boards with processors or as software running on a processor such as a personal computer (PC), or a microcontroller. Details of the operations performed by the hybrid plant controller 308 is described in conjunction with FIGS. 5-15.

Figure 4:
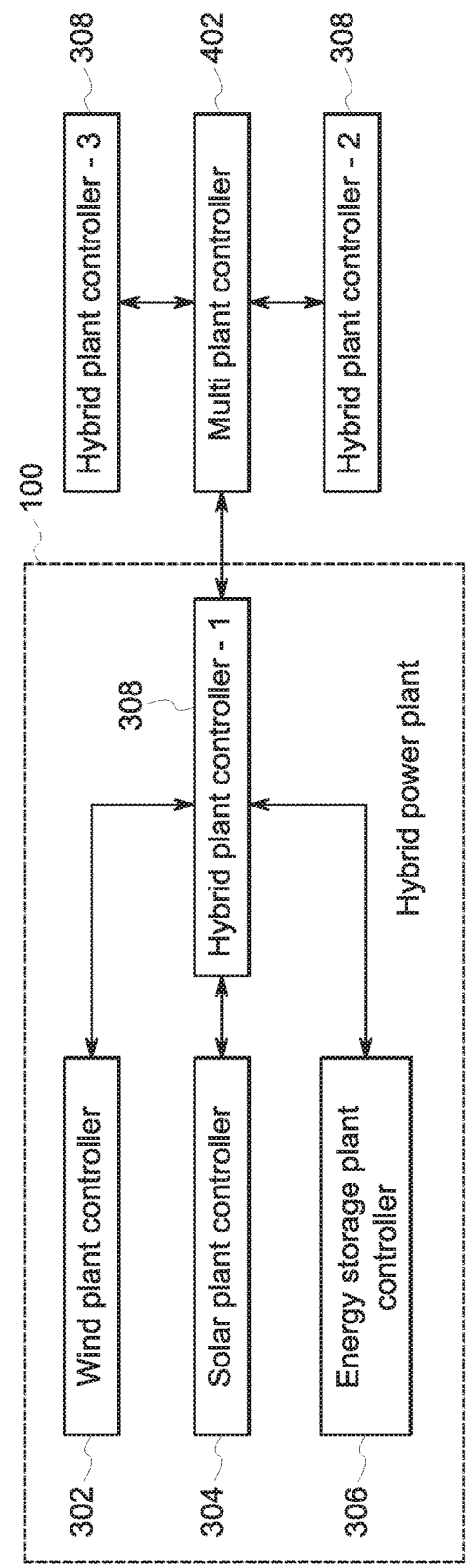
FIG. 4 is a block diagram representation of a multi-plant control system, in accordance with one embodiment of the present specification.

FIG. 4 is a block diagram representation of a multi-plant control system 400, in accordance with one embodiment of the present specification. By way of example, the multi-plant control system 400 may include a plurally of hybrid plant controllers 308, where each hybrid plant controller 308 may be similar to the hybrid plant controller 308 described in FIG. 3 and configured to control operations of one or more of the wind farm controller 302, the solar plant controller 304, and the energy storage plant controller 306 disposed in the respective hybrid power plant 100. FIG. 4 is shown to include three hybrid plant controllers 308—hybrid plant controller-1, hybrid plant controller-2, and hybrid plant controller-3. Without limiting the scope of the present specification, the multi-plant control system 400 may also include less than three or more than three such hybrid plant controllers 308.

Further, in some embodiments, the multi-plant control system 400 may also include a multi-plant controller 402.

The multi-plant controller 402 may be operatively coupled to the hybrid plant controllers 308 (e.g., the hybrid plant controllers 1-3) and configured to control operations thereof. By way of example, the multi-plant controller 402 may be configured receive data from the hybrid plant controllers 308 1-3 and configured to communicate various set-points to the hybrid plant controllers 308 1-3. Further, in some embodiments, multi-plant control system 400 of FIG. 4 may not include a separate multi-plant controller 402, instead one of the hybrid plant controllers 308 may be configured to function as a master controller and other hybrid plant controllers 308 may function as slave controllers under the supervisory control of the master hybrid plant controller. In such a configuration, the master hybrid plant controller may function as the multi-plant controller 402.

In some embodiments, the multi-plant controller 402 may include a specially programmed general-purpose computer, an electronic processor such as a microprocessor, a digital signal processor, and/or a microcontroller. Further, the multi-plant controller 402 may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the multi-plant controller 402 may be implemented as hardware elements such as circuit boards with processors or as software running on a processor such as a personal computer (PC), or a microcontroller.

Figure 5:
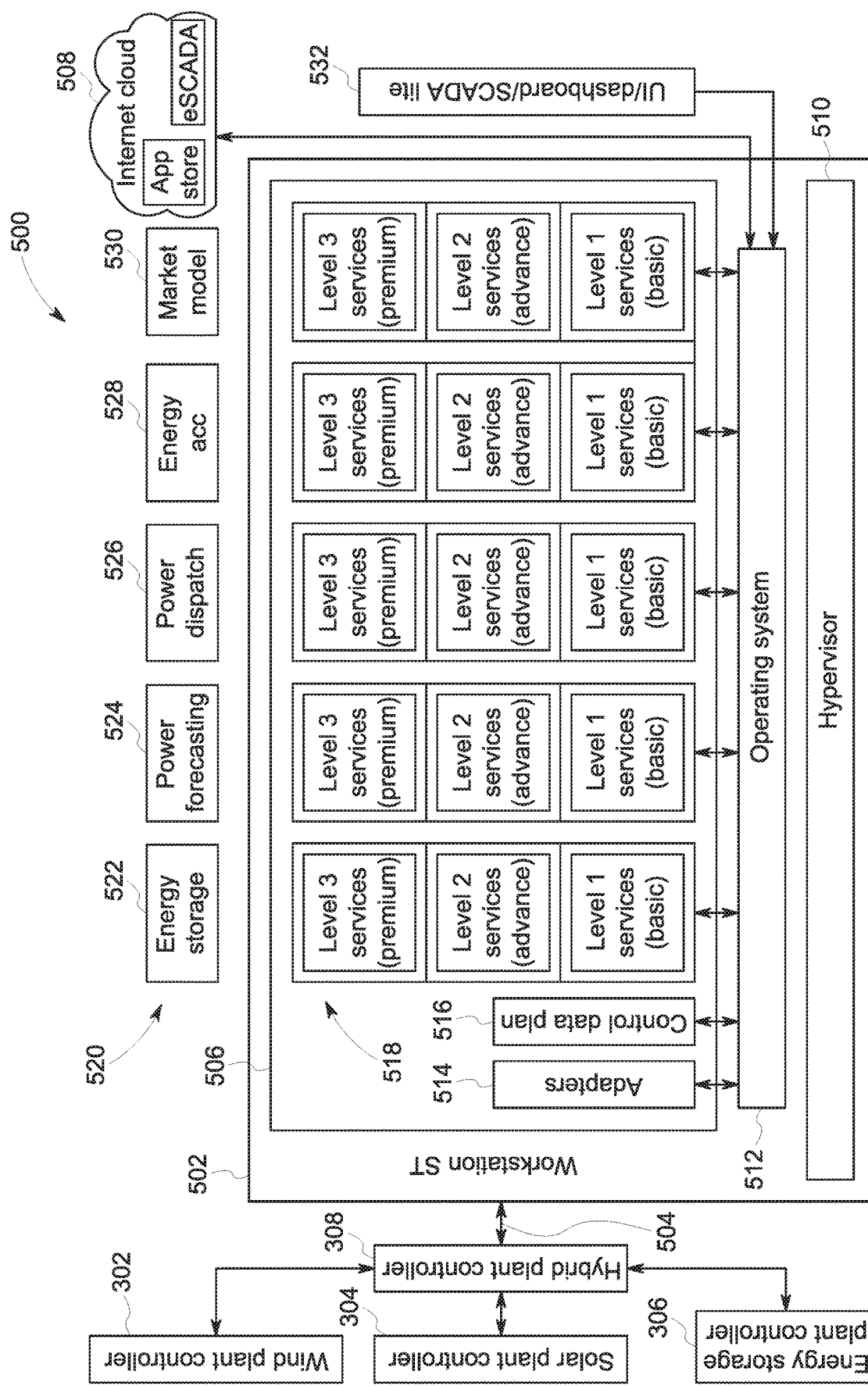
FIG. 5 is a block diagram representation of a control system for a hybrid power plant, in accordance with one embodiment of the present specification.

FIG. 5 is a block diagram representation of a control system 500 for a hybrid power plant 100, in accordance with one embodiment of the present specification. The control system 500 of FIG. 5 may include one or more components that are already described in FIG. 3, the description of which is not repeated herein. By way of a non-limiting example, the control system 500 of FIG. 5 includes one or more of a work station 502, the wind farm controller 302, the solar plant controller 304, the energy storage plant controller 306, or the hybrid plant controller 308.

The work station 502 may be coupled to the hybrid plant controller 308. In some embodiments, the work station 502 may be a server computer that is located at the hybrid power plant 100 where the hybrid plant controller 308 is located or may be remotely coupled to the hybrid plant controller 308. By way of example, the work station 502 may be coupled to the hybrid plant controller 308 via wired or wireless communication links 504. In certain other embodiments, functionalities of the work station 502 may be implemented in one or more of the wind farm controller 302, the solar plant controller 304, the energy storage plant controller 306, or the hybrid plant controller 308, without limiting the scope of the present specification.

In some embodiments, the work station 502 may include a specially programmed general-purpose computer, an electronic processor such as a microprocessor, a digital signal processor, and/or a microcontroller. Further, the work station 502 may include input/output ports, and a storage medium, such as an electronic memory 506. Alternatively, the work station 502 may be implemented as hardware elements such as circuit boards with processors or as software running on a processor such as a personal computer (PC), or a microcontroller. In some embodiments, the work station 502 may also be connected to an internet cloud 508, for example, an Amazon Web Services™ cloud.

The electronic memory 506 in the work station 502 may include various program modules including program instructions that can be executed by the processor disposed in the work station 502. By way of example, the program modules may include a hypervisor 510, an operating system (OS) 512, data communication adaptors 514, a control data plane 516, and plant control services modules 518. By way of example, the hypervisor 510 is a known program that isolates process that separates the OS 512 and applications such as the plant control services modules 518 from the underlying physical hardware.

The plant control services modules 518 may include one or more of level-1 services, level-2 services, and level-3 services. Although, only three levels of services are shown in FIG. 5, the present specification is not limited in this respect and any number of services may be hosted by the work station 502. These services when executed by the processor of the work station 502, the work stations 502 may facilitate control and optimization for various parameters 520 including but not limited to energy storage 522, power forecasting 524, power dispatch 526, energy accounting 528, market modeling 530, or combinations thereof.

In some embodiments, for each parameter 520, the level-1 services may include performing certain basic processing to facilitate control of (e.g., for the purpose of optimizing) the parameter 520. Similarly, for each parameter 520, the level-2 services may include performing certain advanced level processing to facilitate control of (e.g., for the purpose of optimizing) the parameter 520. Moreover, for each parameter 520, the level-3 services may include performing certain premium level processing to facilitate control of (e.g., for the purpose of optimizing) the parameter 520. In some embodiments, the work station 502 may facilitate a user interface 532 to a user/customer/administrator of the hybrid power plant 100 with various options to subscribe to one or more services from a list of level-1 services, a list of level-2 services, and a list of level-3 services with appropriate fees or subscription charges. Additional details of the plant control services modules 518 are described in conjunction with FIG. 6.

In some embodiments, depending on the services subscribed by the user/customer/administrator of the hybrid power plant 100, the work station 502 is configured to control control/optimize the parameters 520 corresponding to the subscribed services. By way of a non-limiting example, for the parameter "energy storage" 522, if the level-2 or level-3 services are not subscribed by the user/customer/administrator of the hybrid power plant 100, setpoints for the energy storage 522 in the hybrid power plant 100 may be determined based on the basic level processing included in the level-1 services. However, for the parameter "energy accounting" 528, if the level-2 services are subscribed by the user/customer/administrator of the hybrid power plant 100, the energy accounting 5285 for the hybrid power plant 100 may be performed using the advanced level processing of the level-2 services corresponding to the energy accounting 528.

As will be appreciated, these services (e.g., the level-1, level-2 services, and level-3 services) are distinct in how the corresponding parameters 520 are determined using additional sensor information from internal (existing asset level data capture buffers) and/or external sources (weather information, predictions, etc.). Underlying complexity of the algorithms for these services may increase form basic (e.g., the level-1 services) to premium (e.g., the level-3 services). In some embodiments, an access or an activation of the subscription to any of these services may be controlled through a license service. The license service may be installed at a central location (e.g., a cloud server 508 and/or a remote operation server) depending on what the customer has subscribed for. In some embodiments, the activation of the subscription to one or more of the services may be accomplished via an automated license validation check at a customer's location against what is available in a central license configuration for the customer. The services may be subscribed or unsubscribed by the customer and can be tracked at the central license server. In certain embodiments, periodic checks may be conducted to ensure that the configuration at the customer's location matches against the selected applications to verify usage of the selected services.

While the above approach requires a network connection to validate licenses/subscriptions, in a scenario where network connectivity is poor, or the network connectivity is not available, subscription may be done manually by the solution provider after a series of validation stages which may include use of one or more of activation codes, passwords, virtual private network (VPN) tokens, and the like. In certain other embodiments, the customer may be able to activate or deactivate services using a configuration user interface. The configuration user interface may display usage statistics corresponding to the services and/or corresponding costs for the subscription determined based on the actual usage of the services.

Figure 6:
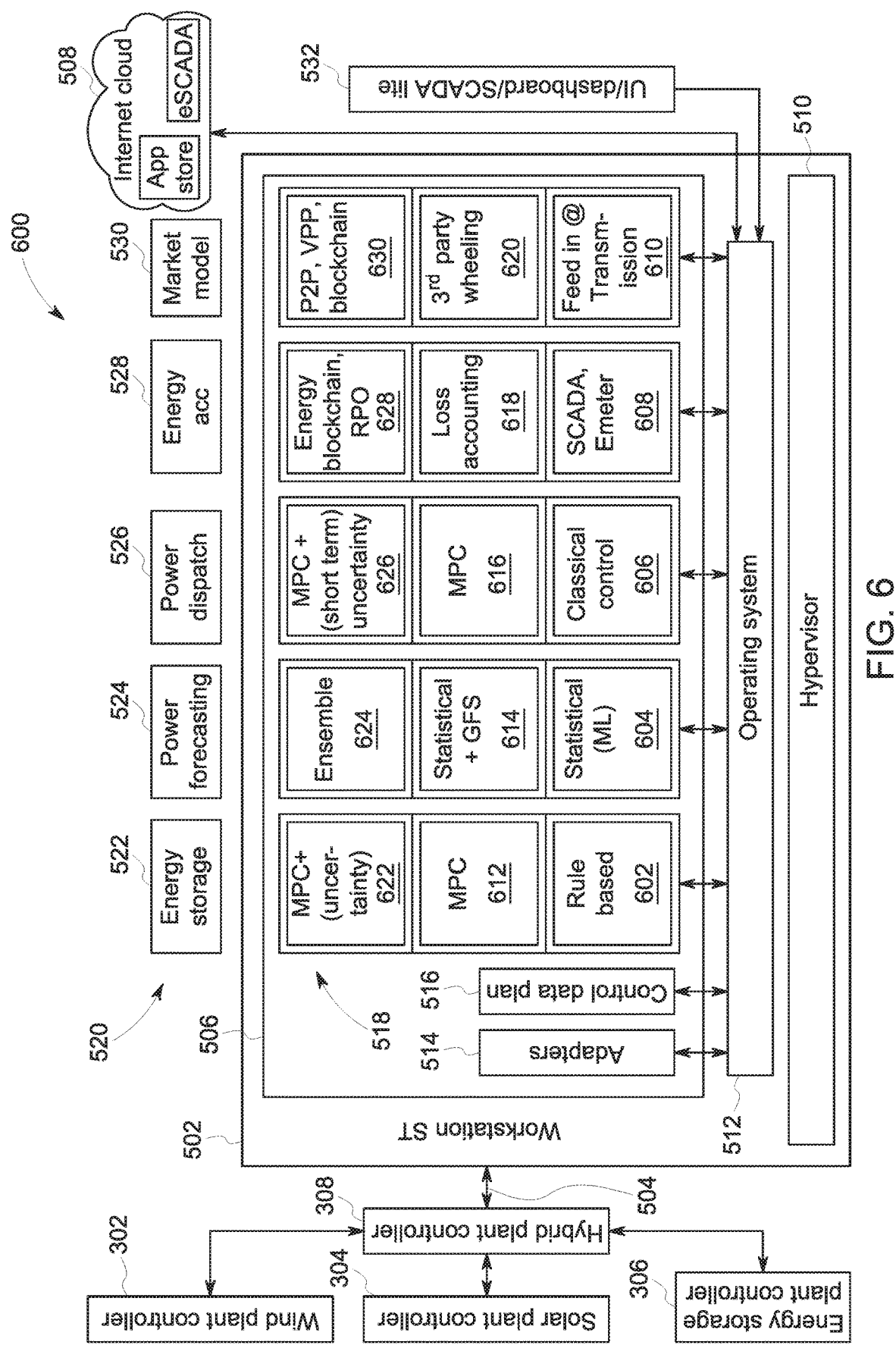
FIG. 6 is a block diagram representation of an example control system for a hybrid power plant, in accordance with one embodiment of the present specification.

FIG. 6 is a block diagram representation of an example control system 600 for a hybrid power plant 100, in accordance with one embodiment of the present specification. The control system 600 of FIG. 6 includes one or more blocks similar to the blocks depicted in FIG. 5, description of which is not repeated herein. In particular, the work station 502 in the control system 600 of FIG. 6 includes plant control services modules 518 that may provide various services that may be subscribed by the user/customer/administrator of the hybrid power plant 100 for the parameters 520 such as energy storage 522, the power forecasting 524, the power dispatch 526, the energy accounting 528, the market modeling 530, or combinations thereof.

In some embodiments, by way of example, the level-1 services for the parameter—"energy storage" 522 may include performing rule-based processing 602. Using such rule-based processing 602, a state of charge (SOC) of the set of energy storage devices 106 may be managed using a pre-defined droop curve where the SOC may be maintained from drifting towards top of charge or bottom of charge. The droop curve may include a bias to a battery command to drive the SOC to a desired range. Further, by way of example, the level-1 services for the parameter—"power forecasting" 524 may include performing statistical processing 604. Such statistical processing 604 may be suitable for medium and short-term forecasts. The statistical processing 604 for power forecasting 524 may use statistical methods based on autoregressive integrated moving average (ARIMA) that utilize past data about power generated by the hybrid power plant 100 to predict a power that can be generated. No additional sensor data other than the ones already available through a supervisory control and data acquisition (SCADA) data stream may be required. The limitation of this basic application is when model predictive control (MPC) may be used or when the look ahead periods are longer. Furthermore, by way of example, the level-1 services for the parameter—"power dispatch" 526 may generally include a classical 606 proportional-integral-derivative (PID) based deviation correction using battery and renewable assets. There may not be any predictive capability in this power dispatch approach. Also, by way of example, the level-1 services for the parameter—"energy accounting" 528 may include SCADA and/or E-meter 608. In these basic energy accounting techniques, a basic display and storage of plant level data in SCADA are provided. Also, energy is accounted via existing AC energy metering solutions. Moreover, by way of example, the level-1 services for the parameter—"market modeling" 530 may include providing basic energy production and feed in 610 at the grid interconnect. This may also include basic grid features such as firming and frequency response.

Referring now to the level-2 services, by way of example, the level-2 services for the parameter—"energy storage" 522 may include the MPC technique/algorithm 612 that allows for optimization of performance requirements and battery life. Advantageously, this MPC based approach for the energy storage 522 may actively extend battery life while meeting the power regulation goals. Further, by way of example, the level-2 services for the parameter—"power forecasting" 524 may include performing statistical processing described hereinabove and processing 614 based on information received from a global forecasting system (GFS). Such GFS based processing 614 may be suitable for short, medium and longer term (e.g., up-to day ahead) for predicting power that can be generated by the hybrid power plant 100. This level-2 service for power dispatch 526 includes use of weather data obtained from the GFS and use of various physics-based models to estimate the power that can be generated by the hybrid power plant. Furthermore, by way of example, the level-2 services for the parameter—"power dispatch" may generally include the MPC 616 based approach where the power dispatch is determined based on a predictive modeling. In such predictive approach, the battery and renewable asset dispatch decisions are taken based on a short-term prediction. This improves performance and conserves battery life as compared to using a classical control 606 approach of level-1. Also, by way of example, the level-2 services for the parameter—"energy accounting" 528 may include a loss accounting (LA) 618 technique which accounts for losses, DC metering and estimating power splits between multiple source points. Moreover, by way of example, the level-2 services for the parameter—"market modeling" 530 may include using "third-party wheeling" 620 mechanism. The third-party wheeling 620 mechanism may include scheduling between the hybrid power plant 100 and the load, inclusion of market mechanisms that enable such transactions (e.g., open access, wheeling, energy banking, etc.).

Turning now to the level-3 services, by way of example, the level-3 services for the parameter—"energy storage" 522 may include accounting 622 for uncertainties in the MPC algorithm 612 that advantageously prevents excessive cycling on the battery due to poor look ahead forecast quality. Further, by way of example, the level-3 services for the parameter—"power forecasting" 524 may include performing an ensemble 624 technique where a third-party forecasting services may be used in combination with the statistical 604 (e.g., machine learning) and GFS 614 based methods. This approach determines optimal weights that provide improved forecasting utilizing multiple sources. Furthermore, by way of example, the level-3 services for the parameter—"power dispatch" 526 may generally include accounting 626 for uncertainties in the MPC 616 based approach. This improves robustness of MPC 616 technique by including formulations that explicitly model uncertainty of forecasts and mitigates detrimental impact of poor forecasts on dispatch quality. Also, by way of example, the level-3 services for the parameter—"energy accounting" 528 may use techniques 628 including energy blockchain, renewable purchase obligation (RPO) accounting, transaction tracking, and tagging using blockchain technology to enable fleet level energy trade across multiple offtakes. Moreover, by way of example, the level-3 services for the parameter—market modeling 530 may include techniques 630 such as peer-to-peer (P2P) trading, sale of power within distribution network, trading within microgrid, virtual power plant (VPP) based aggregation of multiple resources.

By way of example, in some embodiments, in the VPP based aggregation of multiple resources, multiple resources (e.g., power sources) that are physically connected at different locations may be aggregated from a controls perspective to meet a common and/or a distributed power generation goals. An example of such goal may be to serve a combination of loads with reliable power which may be managed by the control of the multiple resources leveraging active power controls of the power sources, battery control to prevent energy spillage or shortage, while also meeting local control requirements such as maintaining voltage, peak shaving of transformer load and other such requirements. By such aggregation and a fleet level control of the power sources, a size of energy storage can be reduced while also having an advantage of a natural leveling of the power generation due to the distribution of the resources in a wider geographical area. Advantageously, this VPP based aggregation of multiple resources leads to reduced overall energy costs (for loads), increased revenue for power sources (sale to off-takers directly) and improved control of active power at a system level. In certain other embodiments, virtualization of generation resources can also be achieved at the bulk system level (e.g., at a transmission level) when a fleet of wind, solar and pumped storage plants are controlled to provide various services to the grid and the loads.

In some embodiments, a user interface 532 is displayed on a display screen (not shown) connected to the work station 502. The user interface 532 may provide various options for the user/customer/administrator of the hybrid power plant 100 to select one or more of the above described level-1, level-2, and/or level-3 services. The selected services may be subscribed by the user/customer/administrator of the hybrid power plant 100 by paying corresponding subscription fees.

In the description hereinafter, the MPC based approach is described. The MPC based approach aids in producing power by the hybrid power plant 100 in a load following manner.

Load following refers to the ability of the hybrid power plant 100 to match a load pattern over a course of an operating day. The key requirement being able to provide the power when and as needed by a load. In this sense, the hybrid power plant 100 follows a load demand. As will be appreciated, the electricity prices are directly correlated to load demand. Advantageously, a capability of being able to procure renewable power that has been shifted to peak periods helps offset power procurement that may be made during peak periods from other expensive generation sources.

Figure 7:
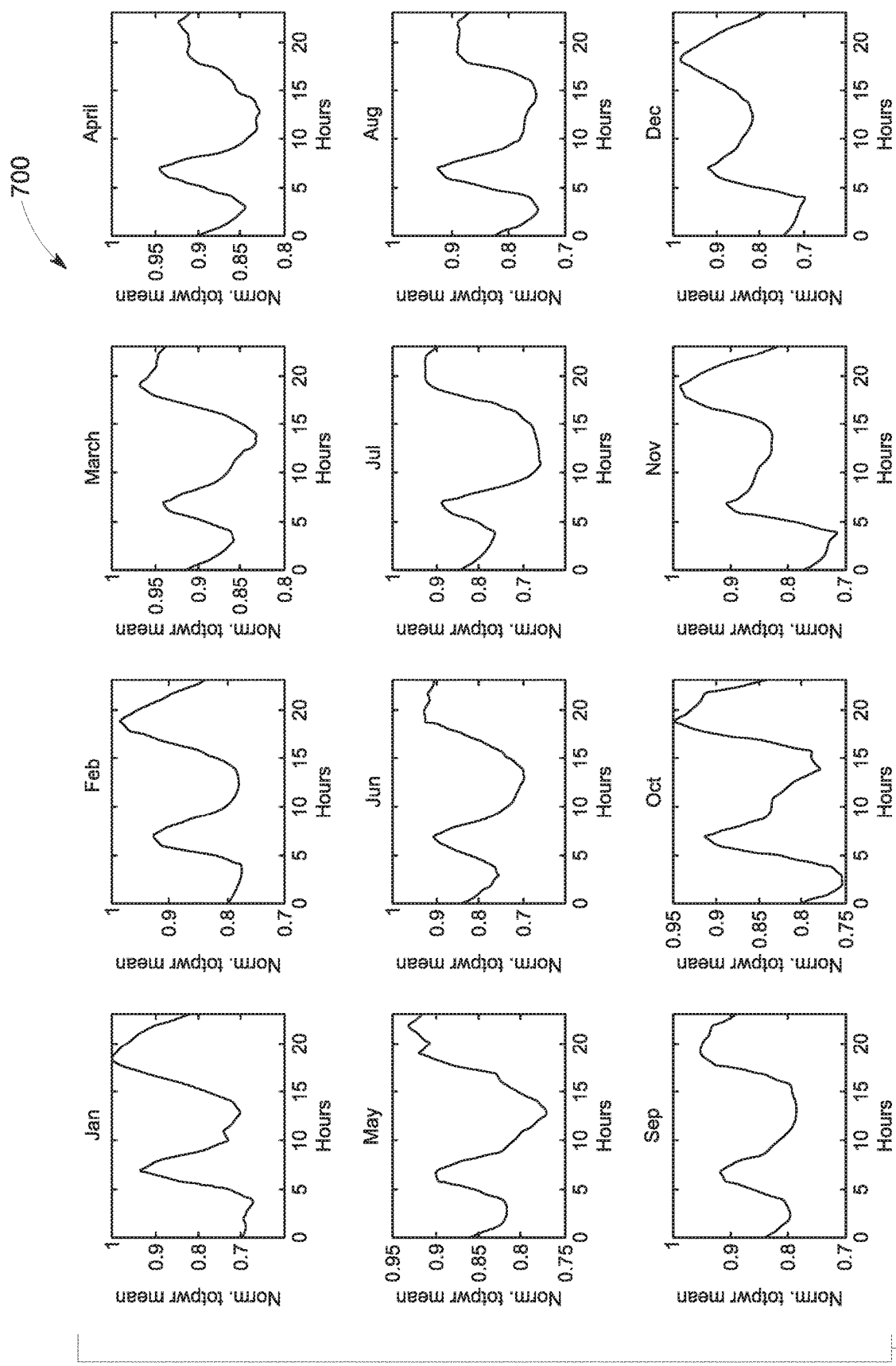
FIG. 7 is a graphical representation showing a normalized mean load demand trend.

In certain countries, for example, India, the demand peak periods are mostly well defined from a time of day perspective and which occur during 6-9 AM and 6-9 PM, for example. The relative composition of lighting loads in the system plays a major role in influencing this pattern. The morning peak is typically lower than the much larger evening peak which may be related directly to the lighting load composition on the system. FIG. 7 depicts graphical representations 700 showing an example normalized mean load demand trend per hour of day in each month of the year (2017) for the state of Tamil Nadu, for example. As depicted in the trends depicted in FIG. 7, there are two peaks in the power demand in a day.

In a conventional renewable power plant (hybrid or otherwise), no consideration is generally given to the time of day and the power being generated by the conventional renewable power plant. Hence, in such a scenario, there may not be a match between the power generated and the load demand. One such example may be a PV plant which may not produce power during the entire evening peak period.

Figure 8:
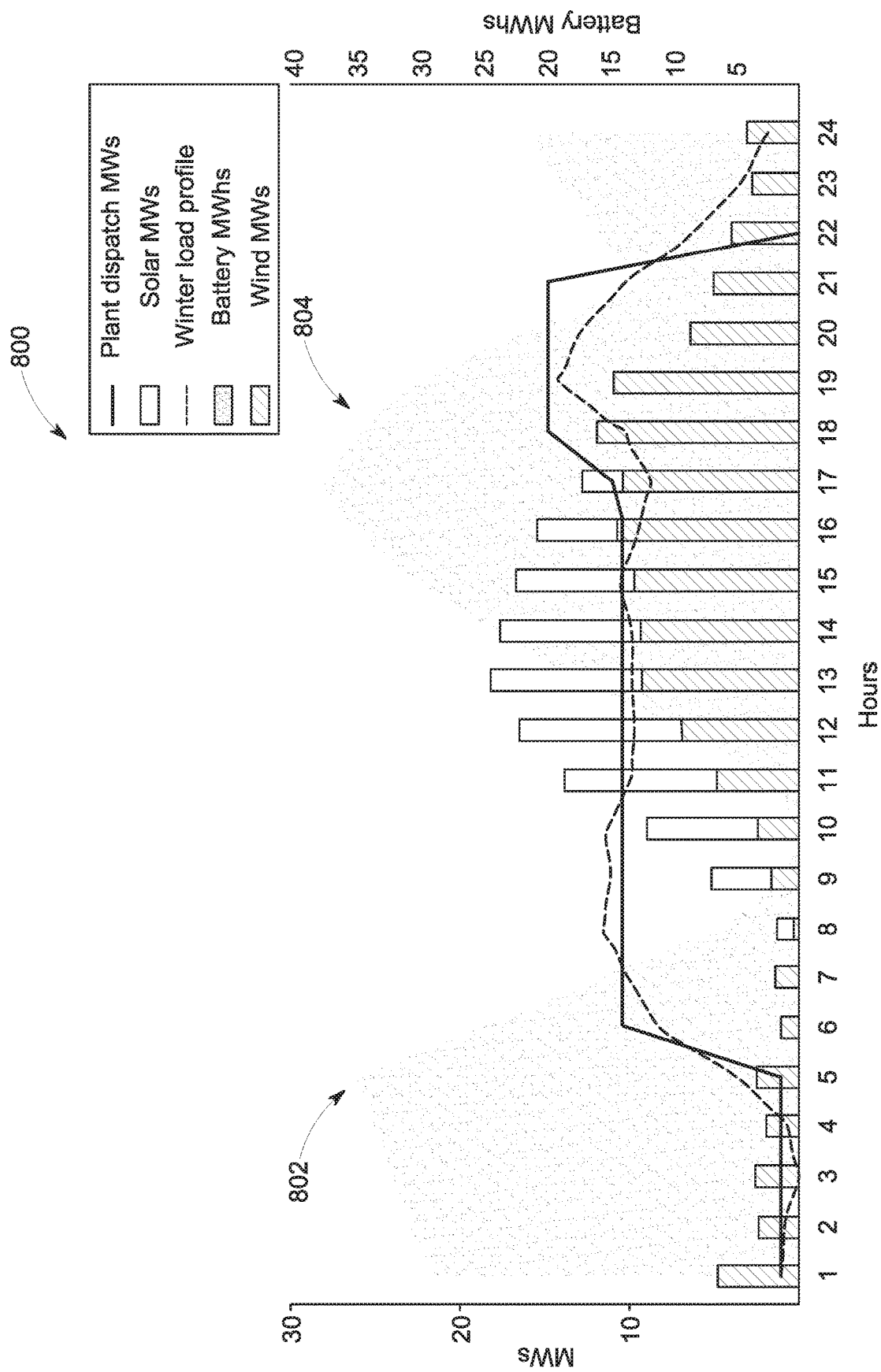
FIG. 8 is a graphical representation indicating how a power may be generated in a load following manner, in accordance with aspects of the present specification.

A load following hybrid power generation in accordance with aspects of the present specification, is be able to control a power output of the hybrid power plant 100 by using the energy storage in the hybrid power plant 100 to provide a desired level of load following to meet such peak power demand. FIG. 8 depicts a graphical representation 800 indicating how the power may be generated in a load following manner for example, in a hybrid power plant having 37.5 MWh energy storage, in accordance with aspects of the present specification. The extent to which the hybrid power plant 100 can meet the load following requirement (duration and peaks) will be bound by the storage size and other balance-of-plant (BOP) limits at plant level. The illustration in FIG. 8 shows a first peak (i.e., a morning peak) 802 during the day occurring at 6 AM and a second peak (i.e., an evening peak) 804 occurring at 6 PM. The energy storage devices 106 in the hybrid power plant 100 may be charged during the low power demand period and discharged to meet the power demand in the peaks 802 and 804.

Figure 9:
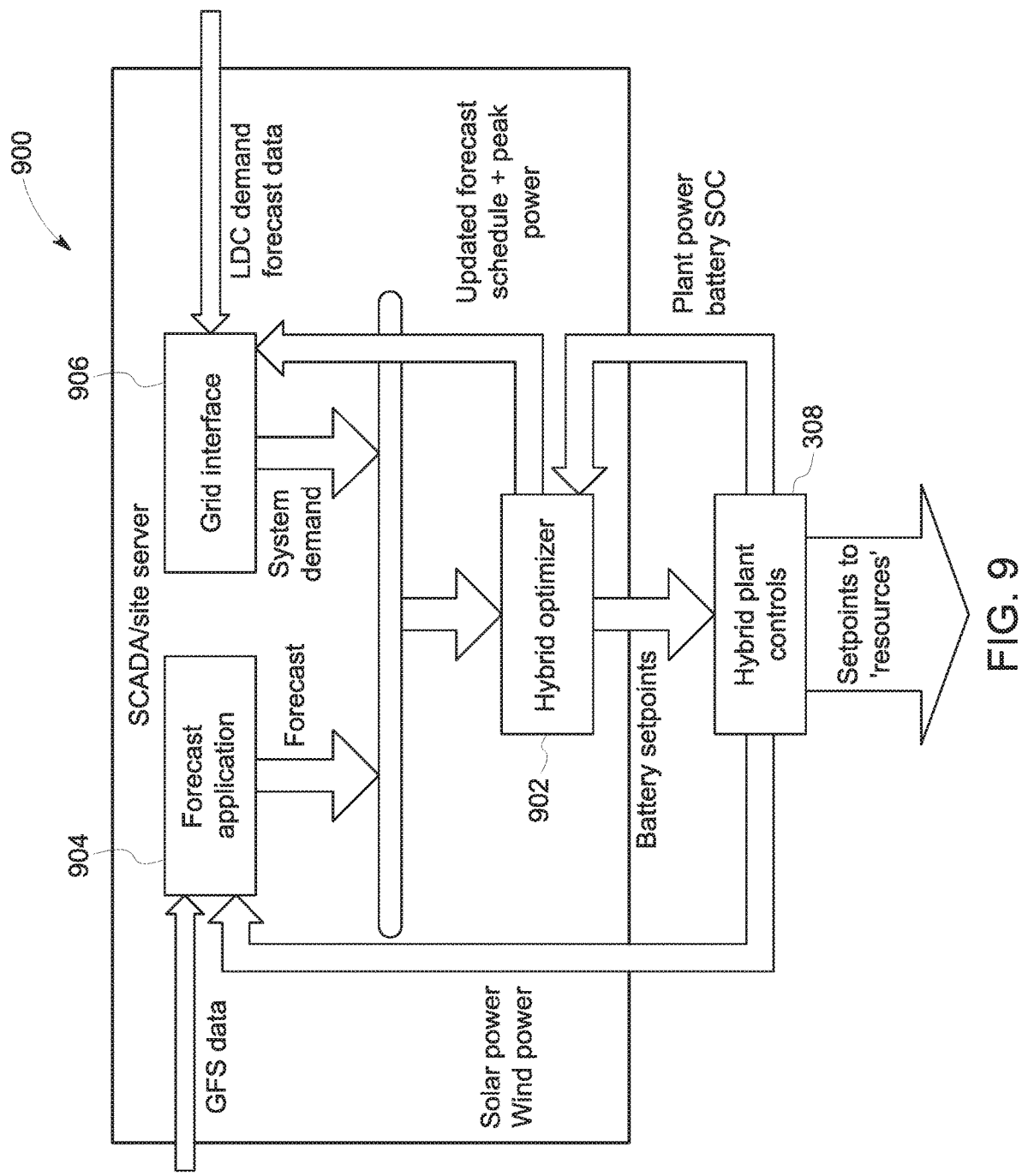
FIG. 9 is a system for facilitating a load following power generation in a hybrid power plant, in accordance with one embodiment of the present specification.

Referring now to FIG. 9, a system 900 for facilitating a load following power generation in a hybrid power plant 100 is presented, in accordance with one embodiment of the present specification. The system 900 depicted in FIG. 9 includes various sub-systems and the interfaces therebetween. The hybrid optimizer 902 determines the optimal storage dispatch command based on certain real time and historical information. The hybrid optimizer 902 interfaces with the forecast application 904, the grid interface 906, and the hybrid plant controller 308. The hybrid optimizer 902 determines the setpoints for the energy storage based on an economically beneficial or performance metric. Uncertainty in the plant output may also be accounted for when determining an optimal dispatch. The data exchange specification is tabulated in tables 1-4.

TABLE 1

Forecast Application: Data Interface Specification

| Input/Output | Name | From Block | Notes |
|---|---|---|---|
| Input | GFS data | External | Contains weather prediction related data that can be used to refine long term forecasts for wind and solar power generation. This will contain data such as wind velocity, direction, air density, GHI (for insolation) etc. |
| Input | Solar Power | Hybrid Plant Controls | Solar power production in a block of time (configurable). This is used to record historical data for use in time series based prediction. |
| Input | Wind Power | Hybrid Plant Controls | Wind power production in a block of time (configurable). This is used to record historical data for use in time series based prediction. |

TABLE 1-continued

Forecast Application: Data Interface Specification

| Input/Output | Name | From Block | Notes |
|---|---|---|---|
| Output | Plant Forecast | — | Plant power prediction in configurable time steps and look ahead periods |

TABLE 2

Grid interface: Data Interface Specification

| Input/Output | Name | From Block | Notes |
|---|---|---|---|
| Input | LDC Demand Forecast | External | Contains the system level demand forecast for a future day. May also contain observed system demand for operating day |
| Input | Updated Forecast | Hybrid Optimizer | Contains the updated forecasts for the plant based on the hybrid optimizer |
| Input | Peak Power | Hybrid Optimizer | Contains the scheduled power based on day ahead scheduler of the optimizer (only for peak periods) |
| Output | System Demand | — | System demand prediction for next operating day. This is used by day ahead scheduler to determine the schedule setpoint for peak periods |

TABLE 3

Hybrid Optimizer: Data Interface Specification

| Input/Output | Name | From Block | Notes |
|---|---|---|---|
| Input | Plant Forecast | Forecast application | Plant level forecasted power |
| Input | System Demand | Grid Interface | System demand for next day |
| Input | Plant Power | Hybrid Plant Controls | Actual Plant Output (feedback) |
| Input | Battery SOC | Hybrid Plant Controls | Actual SOC (aggregate) of storage |
| Output | Battery Setpoint | — | Commanded battery Power |
| Output | Updated Forecast | — | Update to forecast (non-peak) |
| Output | Schedule power for peak | — | Schedule for peak (Day ahead Scheduler) |

TABLE 4

Hybrid Plant Controls: Data Interface Specification

| Input/Output | Name | From Block | Notes |
|---|---|---|---|
| Input | Battery Setpoint | Hybrid Optimizer | Commanded battery Power |
| Output | Plant Power | — | For Hybrid Optimizer (feedback) |
| Output | Battery SOC | — | For Hybrid Optimizer (feedback) |
| Output | Solar Power | — | For Forecast application (feedback) |
| Output | Wind Power | — | For Forecast application (feedback) |

TABLE 4-continued

Hybrid Plant Controls: Data Interface Specification

| Input/Output | Name | From Block | Notes |
|---|---|---|---|
| Output | Resource Setpoints | — | Includes the setpoints sent out from the outer-loop hybrid plant controller to individual plants/controllers/units |

Referring to the hybrid optimizer 902 again, the hybrid optimizer 902 may determine an optimal dispatch pattern for energy storage to derive best possible value from a given storage resource. In some embodiments, the hybrid optimizer 902 may also account for the uncertainty inherent with power production of the hybrid power plant 100. In the case of the load following application, the hybrid optimizer 902 may also take into consideration the need for a more accurate response during peak periods as compared to non-peak periods while determining the optimal dispatch pattern.

Figure 10:
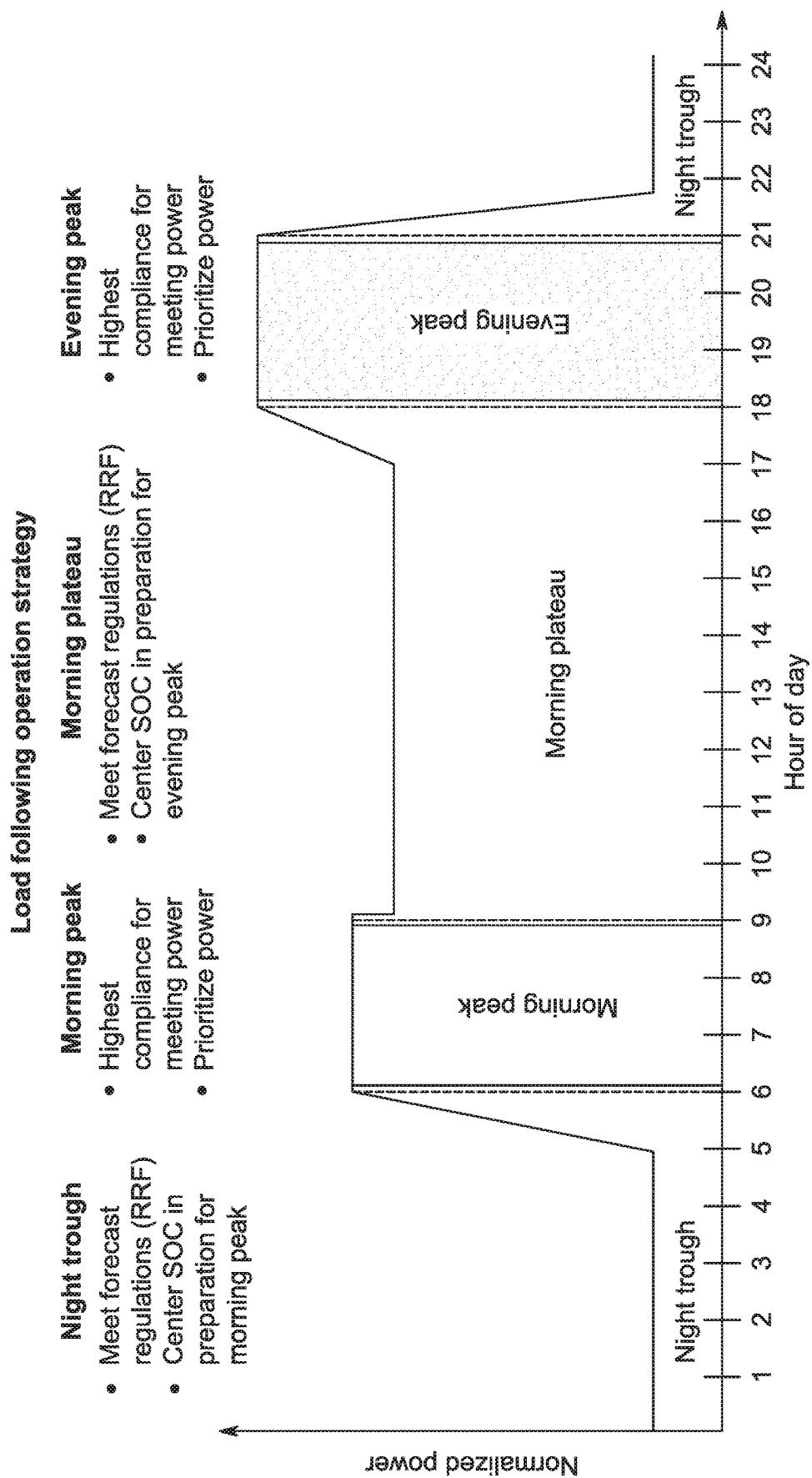
FIG. 10 is a graphical representation illustrating a load following strategy for a hybrid power plant, in accordance with one embodiment of the present specification.

From a load following perspective, the design intent for the hybrid optimizer 902 is to meet the dispatch as specified in FIG. 10, for example. FIG. 10 depicts a graphical representation illustrating a load following strategy for the hybrid power plant 100, in accordance with one embodiment of the present specification. As indicated in FIG. 10, a sufficient storage capacity may be required to meet the morning and evening peaks. All other hours during the day are considered "non-peak" and are used as opportunities for preparing the SOC of the battery with the intent of meeting the peak schedule and to also counteract deviations against a forecast during the non-peak periods (if economic to do so).

Figure 11:
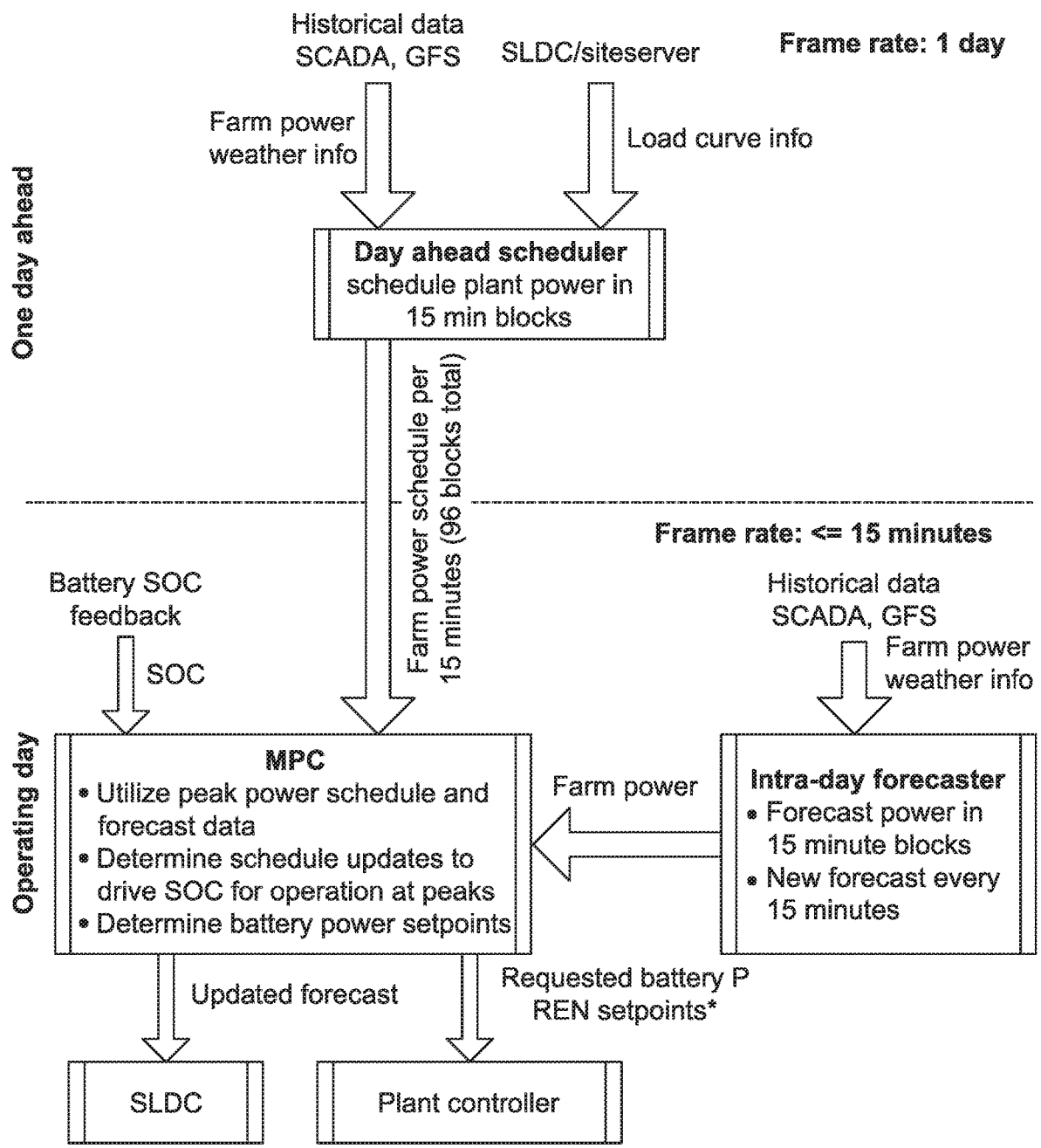
FIG. 11 is a flow diagram of a method for generating power in a load following manner, in accordance with one embodiment of the present specification.
Figure 12:
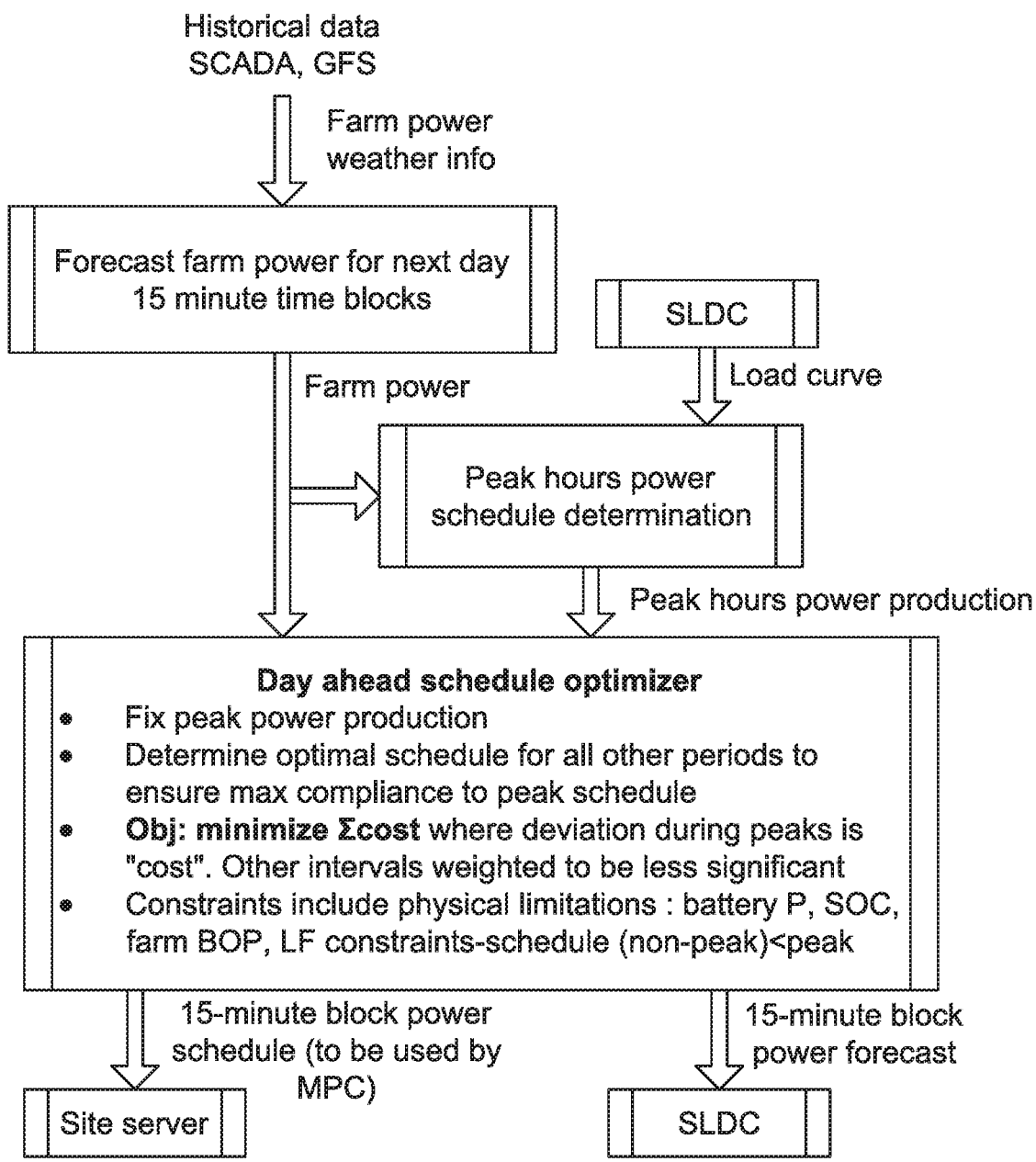
FIG. 12 is a flow diagram showing a method steps of a Day Ahead Scheduler stage of FIG. 11, in accordance with one embodiment of the present specification.

The load following technique consists of two different stages/steps which may be executed at different frame rates due to update rates being inherently different. FIG. 11 is a flow diagram of a method for generating power in a load following manner, in accordance with one embodiment of the present specification. A first stage in FIG. 11 represents a day-ahead scheduling stage where a goal is to determine a power schedule for the peak periods that can be met by the hybrid power plant 100. This is determined based on a demand forecast for the system (used to determine an allocation level for power during peak periods) and the forecasted plant power for the next day. The first stage is completed one day ahead, with the power schedule for the peak periods being fixed during operating day. Here is a high-level summary of the first stage:

First Stage—Day Ahead Scheduler
  Determine an optimal schedule for next day based on a forecast
  Performance (lowest deviation from schedule)
  Use load curve form system and scale the energy to follow the shape of the curve
  Peak periods may be given highest priority
  Submit schedule for next day FIG. 12 is a flow diagram of the Day Ahead Scheduler, in accordance with one embodiment of the present specification. The purpose of the day ahead scheduler is to determine a feasible schedule for next operating day based on forecasted power and forecasted system demand. The demand profile from the load dispatch center may be used as a profile that is used to 're-distribute' the forecasted energy from the park. In an ideal scenario, if the plant output exactly matches this scaled profile, load following power output may be generated. In certain instances, the size of the energy storage devices necessary to achieve such load following may be cost prohibitive. Hence, in some embodiments, the load following behavior of the hybrid power plant 100 may be configured for a few peak periods where the value to the load dispatch center would be maximized. The day ahead scheduler is important because it determines the schedule for the key peak periods. If the schedule is determined to be too high, there may not be sufficient battery capacity to meet it. On the other hand, if the peak schedule is determined to be too low, there would be no issue with accuracy, but it would technically not be a peak if plant power in other intervals exceeds the power during these periods.

Referring again to FIG. 11, the second stage involves the real time optimal control stage, where the battery dispatch is determined based on an MPC approach in a receding horizon formulation. The idea is to determine dispatch of the energy storage device(s) not only based on current feedback, but also based on a short-term prediction of future states. This is especially important when the accuracy/value requirements are different in different intervals. Here is a high-level summary of the second stage:

Second Stage—Intra-Day MPC
  Objective is to meet schedule as closely as possible (least deviation)
  Use a model predictive approach (receding horizon form) to predict within day power
  and determine an optimal battery dispatch
  Short term forecast adjusted based on control goal of meeting peak schedule with highest compliance
  Solve the optimization problem at finer time steps (at 5 minutes, 10 minutes, 15 minutes, etc.)
  Submit optimal battery dispatch to hybrid/plant/battery controller
  Submit updated intra-day forecasts to regulator, for example, an Independent System Operator (ISO), a Regional Transmission Operator (RTO), a State Load Dispatch Center (SLDC), or combinations thereof.

Figure 13:
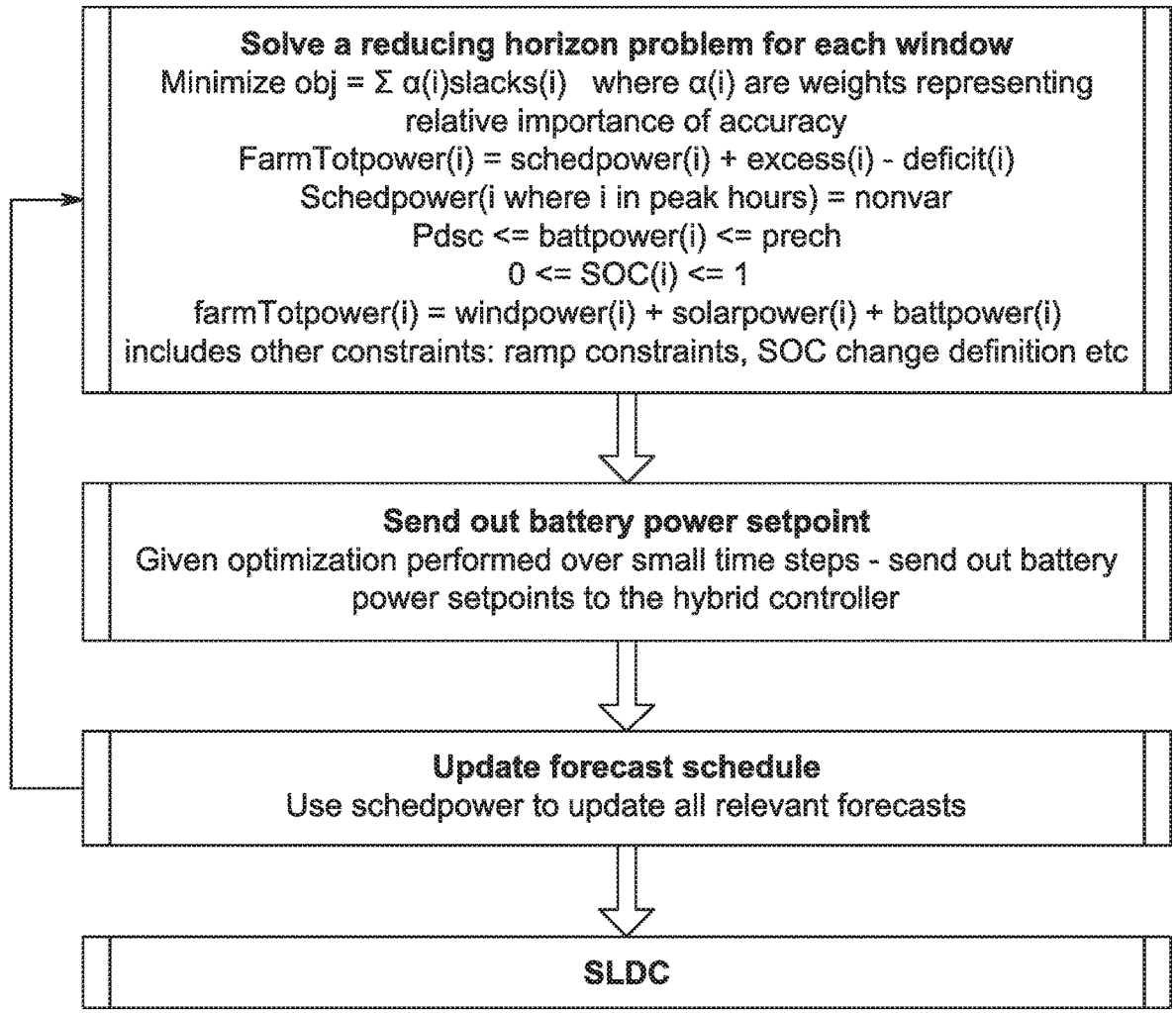
FIG. 13 is a flow diagram showing a method steps of an intra-day MPC based approach stage of FIG. 11, in accordance with one embodiment of the present specification.
Figure 14:
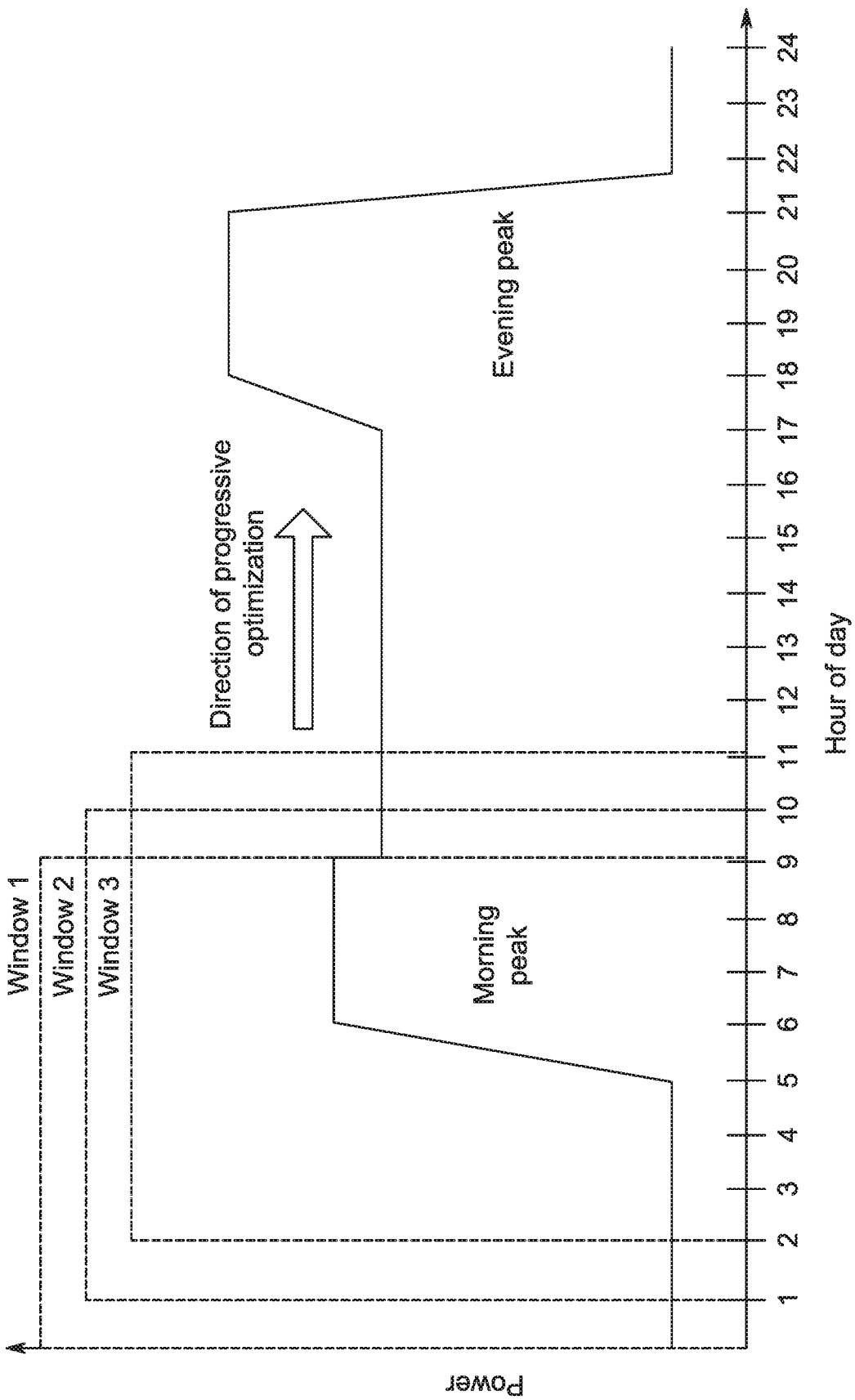
FIG. 14 is a graphical representation showing a load demand over a day and during various short forecast windows, in accordance with one embodiment of the present specification.

FIG. 13 is a flow diagram of the intra-day MPC based approach, in accordance with an embodiment of the present specification. The purpose of the intra-day MPC based approach/algorithm is to determine the setpoint for storage in real time based on plant power and storage SOC feedback. The approach is based on MPC and uses current information and a short forecast window (see FIG. 14) to determine an optimal dispatch for storage. FIG. 14 is a graphical representation showing the load demand over a day and during various short forecast windows.

Figure 15:
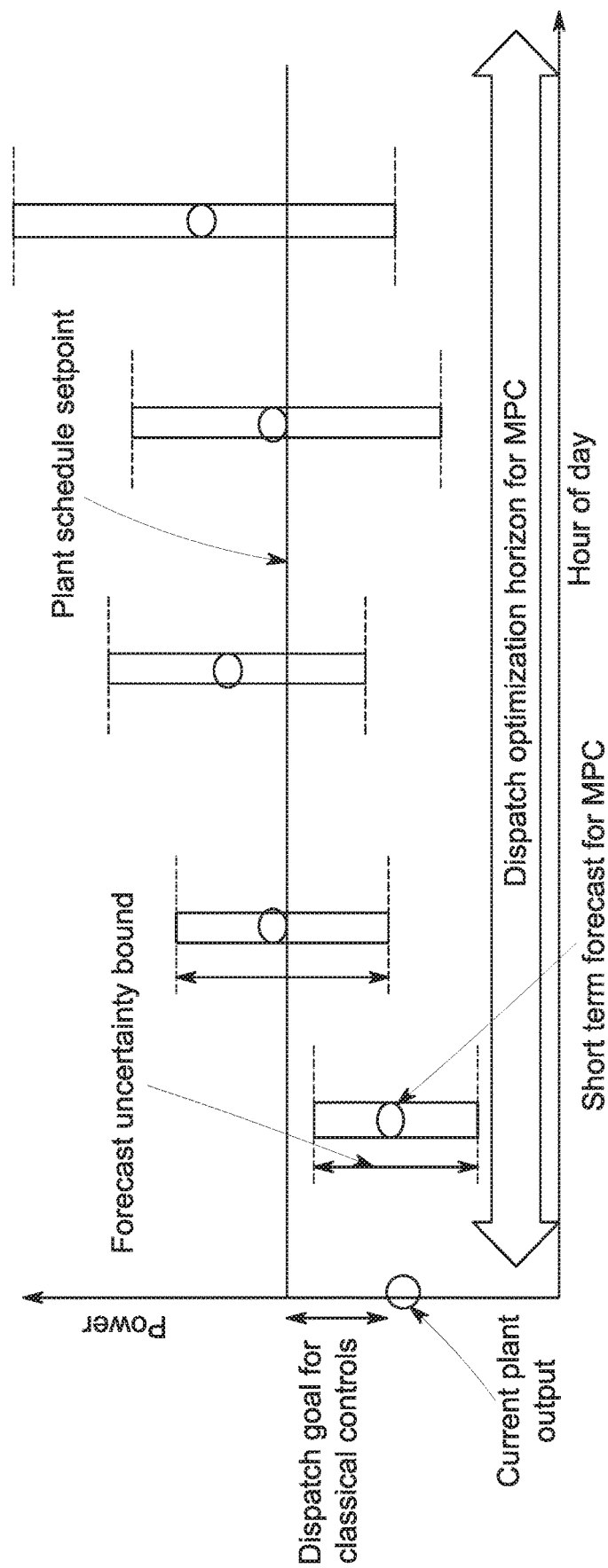
FIG. 15 is a graphical representation showing uncertainty about MPC based short term forecast values of the power generation.

It may be noted that MPC based short term forecast values of the power generation may involve certain uncertainties. In some embodiments, the work station 502 may also facilitate accounting for these uncertainties for enhancing overall life of the energy storage devices 106 used in the hybrid power plant 100. FIG. 15 is a graphical representation showing uncertainty about MPC based short term forecast values of the power generation. In accordance with some embodiments, power dispatch setpoints may be determined based on prediction of the uncertainties to ensure that MPC solution only impacts dispatch when plant prediction certainty is high. In some embodiments, MPC solution with uncertainty accounting may be represented by $$\text{MPC\_obj} = \sum \frac{1}{\sigma(t)} * \text{Cost}(t),$$

where $\sigma(t)$ is the uncertainty around the plant prediction from MPC.

Here are some details of determining the uncertainty around the plant prediction performed using the MPC technique. By way of example, an actual value of forecast/prediction at any time t can be represented as: $y_t = \hat{y}_t + e_t$, where $y_t$ represents actual value of forecast, $\hat{y}_t$ represents a value predicted using the MPC technique/model, and $e_t$ represents an observed error in the forecast.

The objective of the developed forecasting model (e.g., the MPC technique/model) is to minimize $|e_t|$ at all t. For any developed model, value of $e_t$ is drawn from a distribution which comes from the inherent assumptions taken into consideration during the development of model. For example, in an auto-regressive model, $e_t$ is assumed to be white noise. If a range of $e_t$ is quite large, a purpose of developed model may not be served. It may be desirable to have the range of $e_t$ to be as small as possible. In an ideal scenario, $|e_t| \to 0$.

By way of an example, a prediction range of $y_t$ may be defined as $([\hat{y}_t^l, \hat{y}_t^u], p)$, where $\hat{y}_t^l$ represents a lower bound, $\hat{y}_t^u$ represents an upper bound, p represents a probability. Mathematically, $\text{Prob}(y_t \in [\hat{y}_t^l, \hat{y}_t^u] | \hat{y}_t) \geq p$. $[\hat{y}_t^l, \hat{y}_t^u]$ defines the uncertainty in the predicted value. In some embodiments, uncertainty in the predicted value may include uncertainty in the model, uncertain estimates of the parameters in a model (i.e. the confidence intervals for those parameters), and the individual randomness associated with a particular point or points being predicted.

In some embodiments, a method of determining the uncertainty in a single step ahead forecast model may include one or more of following steps.

Predict the Single Step Ahead value on variable on known time stamps of Time Series Data using a ForecastModel Create a vector of errors on known time stamps of Time Series Data.

Let $D_e$ denote the distribution of errors.

$$e_t^l = \frac{1-p^{th}}{2}$$

percentile of $D_e$ and $$e_t^u = \frac{1+p^{th}}{2}$$

percentile of $D_e$.
$\hat{y}_t^l = \hat{y}_t + e_t^l$ and $\hat{y}_t^u = \hat{y}_t + e_t^u$ It may be noted that, if the ForecastModel is an autoregressive model then D_e is normally distributed.

In some embodiments, a method of determining the uncertainty in a multi-step ahead forecast model may include one or more of following steps. Input to the multi-step ahead forecast model may include information from the ForecastModel and time series data, and the probability p. The steps may include one or more of:

Predict a Multi-Step Ahead value based on variable on known time stamps of Time Series Data using ForecastModel Create a vector of errors for each lookahead on known time stamps of time series data.

Let $D_e$ denote the distribution of errors.

$$e_t^l = \frac{1-p^{th}}{2}$$

percentile of $D_e$ and $$e_t^u = \frac{1+p^{th}}{2}$$

percentile of $D_e$.
$\hat{y}_t^l = \hat{y}_t + e_t^l$ and $\hat{y}_t^u = \hat{y}_t + e_t^u$.

What is claimed is:

1. A hybrid power plant comprising:
   a plurality of power sources;
   a plurality of controllers corresponding to and configured to operate said plurality of power sources according to corresponding operating set points;
   a hybrid plant controller coupled to said plurality of controllers and configured to transmit the corresponding operating set points to said plurality of controllers; and
   a computing system coupled to said hybrid plant controller and configured to:
      receive a first set of input parameters from a first subscriber of said hybrid power plant;
      carry out a first level of services to which the first subscriber subscribes, based on the first set of input parameters, to determine operating parameters for the first subscriber;
      receive a second set of input parameters from a second subscriber of said hybrid power plant;
      carry out a second level of services to which the second subscriber subscribes, based on the second set of input parameters, to determine operating parameters for the second subscriber; and
      compute the corresponding operating set points based on an aggregate of i) the operating parameters determined for the first subscriber using the first level of service and ii) the operating parameters determined for the second subscriber using the second level of services.

2. The hybrid power plant of claim 1, wherein said plurality of power sources comprises two or more of a wind power plant, a photovoltaic plant, or an energy storage device.

3. The hybrid power plant of claim 1, wherein the first level of services includes basic processing to determine the operating parameters for at least one of energy storage, power forecasting, power dispatch, energy accounting, or market modeling.

4. The hybrid power plant of claim 3, wherein at least one of:
   i) the first level of services for energy storage includes rule-based processing to determine a battery command based on a pre-defined droop curve to control a state of charge of at least one energy storage device of said plurality of power sources;
   ii) the first level of services for power forecasting includes statistical processing of past data about power generated by said plurality of power sources to generate a power generation forecast for a short-term or a medium-term;
   iii) the first level of services for power dispatch includes executing a proportional-integral-derivative (PID) control loop for determining operating parameters for energy storage devices and renewable power sources of said plurality of power sources;
   iv) the first level of services for energy accounting includes collecting energy consumption data from at least one supervisory control and data acquisition (SCADA) system or an electric meter system; and v) the first level of services for market modeling includes controlling energy production and supply to an electric grid interconnect.

5. The hybrid power plant of claim 1, wherein the second level of services includes advanced processing to determine the operating parameters for at least one of energy storage, power forecasting, power dispatch, energy accounting, or market modeling.

6. The hybrid power plant of claim 5, wherein the second level of services for energy storage includes processing of input parameters to determine a battery command to control a state of charge of at least one energy storage device of said plurality of power sources to optimize performance requirements of the second subscriber and to extend a service life of the at least one energy storage device.

7. The hybrid power plant of claim 5, wherein the second level of services for power forecasting includes:
receiving global forecasting system (GFS) data; and
statistical processing of past data about power generated by said plurality of power sources and the GFS data to generate a power generation forecast for a short-term up to one day ahead.

8. The hybrid power plant of claim 5, wherein the second level of services for power dispatch includes:
receiving global forecasting system (GFS) data including weather data;
executing a physics-based model to estimate power generation by said plurality of power sources;
executing a predictive model to predict short-term power demand for the second subscriber; and
determining operating parameters for energy storage devices and renewable power sources of said plurality of power sources based on the predicted short-term power demand.

9. The hybrid power plant of claim 5, wherein the second level of services for energy accounting includes collecting loss data, DC metering data, and power split data between at least two of said plurality of power sources.

10. The hybrid power plant of claim 5, wherein the second level of services for market modeling includes generating a generation schedule for said plurality of power sources and generating a consumption schedule for the second subscriber.

11. The hybrid power plant of claim 1, wherein said computing system is further configured to:
receive a third set of input parameters from a third subscriber of said hybrid power plant;
carry out a third level of services to which the third subscriber subscribes, based on the third set of input parameters, to determine operating parameters for the third subscriber; and
compute the corresponding operating set points based on an aggregate of i) the operating parameters determined for the first subscriber using the first level of services, ii) the operating parameters determined for the second subscriber using the second level of services, and iii) the operating parameters determined for the third subscriber using the third level of services.

12. The hybrid power plant of claim 11, wherein the third level of services includes further advanced processing to determine the operating parameters for at least one of energy storage, power forecasting, power dispatch, energy accounting, or market modeling.

13. The hybrid power plant of claim 12, wherein the third level of services for energy storage includes processing of a power generation forecast to determine uncertainties and to prevent excessive cycling on at least one energy storage device of said plurality of power sources.

14. The hybrid power plant of claim 12, wherein the third level of services for power forecasting includes:
receiving global forecasting system (GFS) data;
statistical processing of past data about power generated by said plurality of power sources and the GFS data to generate a power generation forecast for a short-term up to one day ahead; and
combining the power generation forecast with a third-party power generation forecast.

15. The hybrid power plant of claim 12, wherein the third level of services for power dispatch includes:
receiving global forecasting system (GFS) data including weather data;
executing a physics-based model to estimate power generation by said plurality of power sources;
executing a predictive model to predict short-term power demand for the second subscriber;
processing predicted short-term power demand to determine uncertainties; and
determining operating parameters for energy storage devices and renewable power sources of said plurality of power sources based on the predicted short-term power demand and the uncertainties.

16. The hybrid power plant of claim 12, wherein the third level of services for energy accounting includes:
enabling renewable purchase obligation (RPO) accounting; and
tracking energy transactions using tagging and blockchain technology.

17. The hybrid power plant of claim 12, wherein the third level of services for market modeling includes:
enabling peer-to-peer energy trading;
enabling sale of power within a distribution network;
enabling energy trading within a microgrid; and
enabling energy aggregation of two or more of said plurality of power sources to define a virtual power plant.

18. The hybrid power plant of claim 1, wherein said computing system is further configured to compute the corresponding operating set points according to a load following scheme.

19. A method of controlling power generation by a hybrid power plant, said method comprising:
dispatching energy storage set points for at least one energy storage device based on real-time and historical power generation and power demand data, and based on a power generation forecast and a power demand prediction;
computing operating set points based on the power generation forecast, the power demand prediction, and an actual state of charge for the at least one energy storage device, for a plurality of subscribers for the hybrid power plant; and
transmitting the operating set points to a plurality of controllers for a plurality of power sources of the hybrid power plant.

20. The method of claim 19, wherein dispatching energy storage set points further comprises determining uncertainty in the power generation forecast and the power demand prediction.

* * * * *